United States Patent
Myung et al.

(10) Patent No.: US 11,617,202 B2
(45) Date of Patent: Mar. 28, 2023

(54) METHOD AND APPARATUS FOR TRANSMITTING/RECEIVING A PHYSICAL UPLINK SHARED CHANNEL (PUSCH) IN WIRELESS COMMUNICATION SYSTEM

(71) Applicant: LG ELECTRONICS INC., Seoul (KR)

(72) Inventors: Sechang Myung, Seoul (KR); Seonwook Kim, Seoul (KR); Suckchel Yang, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 17/648,929

(22) Filed: Jan. 25, 2022

(65) Prior Publication Data

US 2022/0159712 A1    May 19, 2022

Related U.S. Application Data

(63) Continuation of application No. PCT/KR2020/013451, filed on Oct. 5, 2020.

(Continued)

(30) Foreign Application Priority Data

Nov. 7, 2019  (KR) .................. 10-2019-0141932
Mar. 6, 2020  (KR) .................. 10-2020-0028557
Apr. 6, 2020  (KR) .................. 10-2020-0041789

(51) Int. Cl.
*H04L 12/28* (2006.01)
*H04W 74/00* (2009.01)
(Continued)

(52) U.S. Cl.
CPC ......... *H04W 74/006* (2013.01); *H04W 16/14* (2013.01)

(58) Field of Classification Search
CPC ............ H04W 16/14; H04W 72/1284; H04W 74/0833; H04W 72/0413; H04W 72/0446;
(Continued)

(56) References Cited

U.S. PATENT DOCUMENTS

2021/0007149 A1* 1/2021 Li ................. H04W 74/0833
2021/0050976 A1* 2/2021 Noh ................. H04B 7/0626
(Continued)

FOREIGN PATENT DOCUMENTS

| EP | 3499976 | 6/2019 |
| KR | 1020190018685 | 2/2019 |
| WO | 2019138149 | 7/2019 |

OTHER PUBLICATIONS

LG Electronics, "Channel access procedure for NR-U," 3GPP TSG-RAN WG1 Meeting #98, R1-1908535, Aug. 2019, 16 pages.
(Continued)

*Primary Examiner* — John Pezzlo
(74) *Attorney, Agent, or Firm* — Lee, Hong, Degerman, Kang & Waimey PC

(57) ABSTRACT

Disclosed in various embodiments are a method for transmitting and receiving signals in a wireless communication system, and an apparatus for supporting same, the method comprising the steps of: receiving, by means of an upper layer signal, information associated with a physical uplink shared channel (PUSCH) starting location, and a plurality of combinations of channel access procedure (CAP) types; receiving DCI comprising one combination from among the plurality of combinations; and transmitting PUSCH on the basis of the one combination, wherein the plurality of combinations is a part of the information associated with the PUSCH starting location and collection of candidate combinations of CAP types.

18 Claims, 21 Drawing Sheets

Related U.S. Application Data

(60) Provisional application No. 62/911,170, filed on Oct. 4, 2019.

(51) Int. Cl.
 *H04W 16/14* (2009.01)
 *H04J 1/16* (2006.01)

(58) Field of Classification Search
 CPC ............. H04W 74/0808; H04W 80/02; H04L 5/0053; H04L 5/0007
 USPC ................................ 370/230, 252, 329, 386
 See application file for complete search history.

(56) References Cited

U.S. PATENT DOCUMENTS

| | | | | |
|---|---|---|---|---|
| 2022/0014337 | A1* | 1/2022 | Ouchi | H04L 5/0057 |
| 2022/0104259 | A1* | 3/2022 | Li | H04W 74/0816 |
| 2022/0132564 | A1* | 4/2022 | Ouchi | H04W 72/0453 |
| 2022/0174735 | A1* | 6/2022 | Li | H04W 16/14 |
| 2022/0183053 | A1* | 6/2022 | Li | H04W 74/0808 |

OTHER PUBLICATIONS

Qualcomm Incorporated, "Channel access procedures for NR unlicensed," 3GPP TSG-RAN WG1 #98, R1-1909245, Aug. 2019, 20 pages.

Nokia, Nokia Shanghai Bell, "Feature Lead's Summary #3 on Channel Access Procedures," 3GPP TSG-RAN WG1 Meeting #98, R1-1909810, Sep. 2019, 29 pages.

PCT International Application No. PCT/KR2020/013451, Written Opinion of the International Searching Authority dated Jan. 26, 2021, 8 pages.

European Patent Office Application Serial No. 20872276.9, Search Report dated Sep. 23, 2022, 9 pages.

* cited by examiner (a) Uplink Tx procedure based on dynamic grant (b) Uplink Tx procedure based on configured grant (a) Carrier aggregation between L-band and U-band (b) Standalone U-band(s)

METHOD AND APPARATUS FOR TRANSMITTING/RECEIVING A PHYSICAL UPLINK SHARED CHANNEL (PUSCH) IN WIRELESS COMMUNICATION SYSTEM

CROSS-REFERENCE TO RELATED APPLICATIONS

This application is a continuation of International Application No. PCT/KR2020/013451, filed on Oct. 5, 2020, which claims the benefit of U.S. Provisional Patent Application No. 62/911,170, filed on Oct. 4, 2019, and also claims the benefit of earlier filing date and right of priority to Korean Application No. 10-2019-0141932, filed on Nov. 7, 2019, 10-2020-0028557, filed on Mar. 6, 2020, 10-2020-0041789, filed on Apr. 6, 2020, the contents of which are all hereby incorporated by reference herein in their entirety.

TECHNICAL FIELD

The present disclosure relates to a method and apparatus for transmitting and receiving a signal in a wireless communication system.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

DISCLOSURE

Technical Problem

Provided are a method and apparatus for efficiently performing a wireless signal transmission and reception procedure.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

According to a first aspect of the present disclosure, provided herein is a method performed by a user equipment (UE) in a wireless communication system, including: receiving a plurality of combinations of a channel access procedure (CAP) type and information related to a physical uplink shared channel (PUSCH) starting position through a higher layer signal; receiving downlink control information (DCI) including one combination among the plural combinations; and transmitting a PUSCH based on the one combination. The plural combinations are a part of a set of candidate combinations of the CAP type and the information related to the PUSCH starting position.

In another aspect of the present disclosure, provided herein is a user equipment (UE) used in a wireless communication system, including: at least one transceiver; at least one processor; and at least computer memory operably connected to the at least one transceiver and the at least one processor and configured to cause, when executed, the at least one transceiver and the at least one processor to perform an operation. The operation includes: receiving a plurality of combinations of a channel access procedure (CAP) type and information related to a physical uplink shared channel (PUSCH) starting position through a higher layer signal; receiving downlink control information (DCI) including one combination among the plural combinations; and transmitting a PUSCH based on the one combination. The plural combinations may be a part of a set of candidate combinations of the CAP type and the information related to the PUSCH starting position.

In a third aspect of the present disclosure, provided herein is an apparatus for a user equipment (UE), including: at least one processor; and at least memory configured to store one or more instructions which cause the at least one processor to perform an operation. The operation includes: receiving a plurality of combinations of a channel access procedure (CAP) type and information related to a physical uplink shared channel (PUSCH) starting position through a higher layer signal; receiving downlink control information (DCI) including one combination among the plural combinations; and transmitting a PUSCH based on the one combination. The plural combinations may be a part of a set of candidate combinations of the CAP type and the information related to the PUSCH starting position.

In a fourth aspect of the present disclosure, provided herein is a processor-readable medium storing one or more instructions which cause at least one processor to perform an operation. The operation includes: receiving a plurality of combinations of a channel access procedure (CAP) type and information related to a physical uplink shared channel (PUSCH) starting position through a higher layer signal; receiving downlink control information (DCI) including one combination among the plural combinations; and transmitting a PUSCH based on the one combination. The plural combinations may be a part of a set of candidate combinations of the CAP type and the information related to the PUSCH starting position.

The information related to the PUSCH starting position may be related to a cyclic prefix (CP).

The PUSCH starting position may be determined based on a subcarrier spacing (SCS).

The PUSCH starting position may be determined based on a timing advance (TA).

The plural combinations may be selected from the set of the candidate combinations based on a channel access mode.

The number of CAP types may be 4, the number of PUSCH starting positions may be m, the set of the candidate combinations may include a maximum of 4m combinations, and m may be a natural number.

The PUSCH may be transmitted in an unlicensed band.

The apparatus applied to an embodiment of the present disclosure may include an autonomous driving device.

The above-describe aspects of the present disclosure are merely a part of preferred embodiments of the present disclosure, and those skilled in the art will derive and understand various embodiments reflecting technical features of the present disclosure based on the following detailed description of the present disclosure.

Advantageous Effects

According to embodiments of the present disclosure, a signal may be efficiently transmitted and received in a wireless communication system.

According to embodiments of the present disclosure, an efficient signal transmission method considering the characteristics of an unlicensed band is provided.

According to embodiments of the present disclosure, a type of a channel access procedure (CAP) and an uplink starting position in an unlicensed band may be efficiently indicated.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

The accompanying drawings, which are included to provide a further understanding of the disclosure, illustrate embodiments of the disclosure and together with the description serve to explain the principle of the disclosure.

BEST MODE

The following technology may be used in various wireless access systems such as code division multiple access (CDMA), frequency division multiple access (FDMA), time division multiple access (TDMA), orthogonal frequency division multiple access (OFDMA), single carrier frequency division multiple access (SC-FDMA), and so on. CDMA may be implemented as a radio technology such as universal terrestrial radio access (UTRA) or CDMA2000. TDMA may be implemented as a radio technology such as global system for mobile communications (GSM)/general packet radio service (GPRS)/enhanced data rates for GSM evolution (EDGE). OFDMA may be implemented as a radio technology such as institute of electrical and electronics engineers (IEEE) 802.11 (wireless fidelity (Wi-Fi)), IEEE 802.16 (worldwide interoperability for microwave access (WiMAX)), IEEE 802.20, evolved UTRA (E-UTRA), and so on. UTRA is a part of universal mobile telecommunications system (UMTS). 3rd generation partnership project (3GPP) long term evolution (LTE) is a part of evolved UMTS (E-UMTS) using E-UTRA, and LTE-advanced (LTE-A) is an evolution of 3GPP LTE. 3GPP new radio or new radio access technology (NR) is an evolved version of 3GPP LTE/LTE-A.

As more and more communication devices require larger communication capacities, the need for enhanced mobile broadband communication relative to the legacy radio access technologies (RATs) has emerged. Massive machine type communication (MTC) providing various services to inter-connected multiple devices and things at any time in any place is one of significant issues to be addressed for next-generation communication. A communication system design in which services sensitive to reliability and latency are considered is under discussion as well. As such, the introduction of the next-generation radio access technology (RAT) for enhanced mobile broadband communication (eMBB), massive MTC (mMTC), and ultra-reliable and low latency communication (URLLC) is being discussed. For convenience, this technology is called NR or New RAT in the present disclosure.

While the following description is given in the context of a 3GPP communication system (e.g., NR) for clarity, the technical spirit of the present disclosure is not limited to the 3GPP communication system. For the background art, terms, and abbreviations used in the present disclosure, refer to the technical specifications published before the present disclosure (e.g., 38.211, 38.212, 38.213, 38.214, 38.300, 38.331, and so on).

In a wireless access system, a user equipment (UE) receives information from a base station (BS) on DL and transmits information to the BS on UL. The information transmitted and received between the UE and the BS includes general data and various types of control information. There are many physical channels according to the types/usages of information transmitted and received between the BS and the UE.

Figure 1:
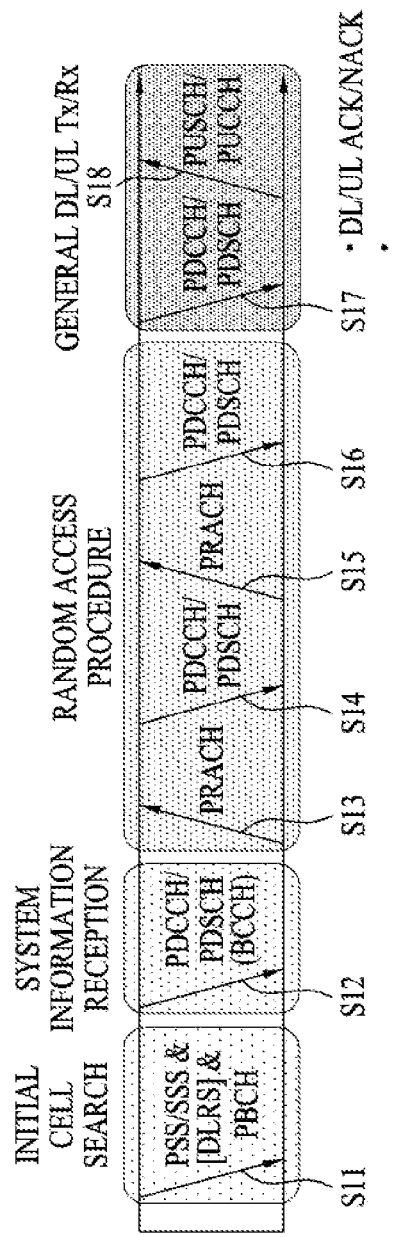
FIG. 1 illustrates physical channels and a general signal transmission method using the physical channels in a 3rd generation partnership project (3GPP) system as an exemplary wireless communication system.

FIG. 1 illustrates physical channels and a general signal transmission method using the physical channels in a 3GPP system.

When a UE is powered on or enters a new cell, the UE performs initial cell search (S11). The initial cell search involves acquisition of synchronization to a BS. For this purpose, the UE receives a synchronization signal block (SSB) from the BS. The SSB includes a primary synchronization signal (PSS), a secondary synchronization signal (SSS), and a physical broadcast channel (PBCH). The UE synchronizes its timing to the BS and acquires information such as a cell identifier (ID) based on the PSS/SSS. Further, the UE may acquire information broadcast in the cell by receiving the PBCH from the BS. During the initial cell search, the UE may also monitor a DL channel state by receiving a downlink reference signal (DL RS).

After the initial cell search, the UE may acquire more detailed system information by receiving a physical downlink control channel (PDCCH) and a physical downlink shared channel (PDSCH) corresponding to the PDCCH (S12).

Subsequently, to complete connection to the BS, the UE may perform a random access procedure with the BS (S13 to S16). Specifically, the UE may transmit a preamble on a physical random access channel (PRACH) (S13) and may receive a PDCCH and a random access response (RAR) for the preamble on a PDSCH corresponding to the PDCCH (S14). The UE may then transmit a physical uplink shared channel (PUSCH) by using scheduling information in the RAR (S15), and perform a contention resolution procedure including reception of a PDCCH and a PDSCH signal corresponding to the PDCCH (S16).

When the random access procedure is performed in two steps, steps S13 and S15 may be performed as one step (in which Message A is transmitted by the UE), and steps S14 and S16 may be performed as one step (in which Message B is transmitted by the BS).

After the above procedure, the UE may receive a PDCCH and/or a PDSCH from the BS (S17) and transmit a physical uplink shared channel (PUSCH) and/or a physical uplink control channel (PUCCH) to the BS (S18), in a general UL/DL signal transmission procedure. Control information that the UE transmits to the BS is generically called uplink control information (UCI). The UCI includes a hybrid automatic repeat and request acknowledgement/negative acknowledgement (HARQ-ACK/NACK), a scheduling request (SR), channel state information (CSI), and so on. The CSI includes a channel quality indicator (CQI), a precoding matrix index (PMI), a rank indication (RI), and so on. In general, UCI is transmitted on a PUCCH. However, if control information and data should be transmitted simultaneously, the control information and the data may be transmitted on a PUSCH. In addition, the UE may transmit the UCI aperiodically on the PUSCH, upon receipt of a request/command from a network.

Figure 2:
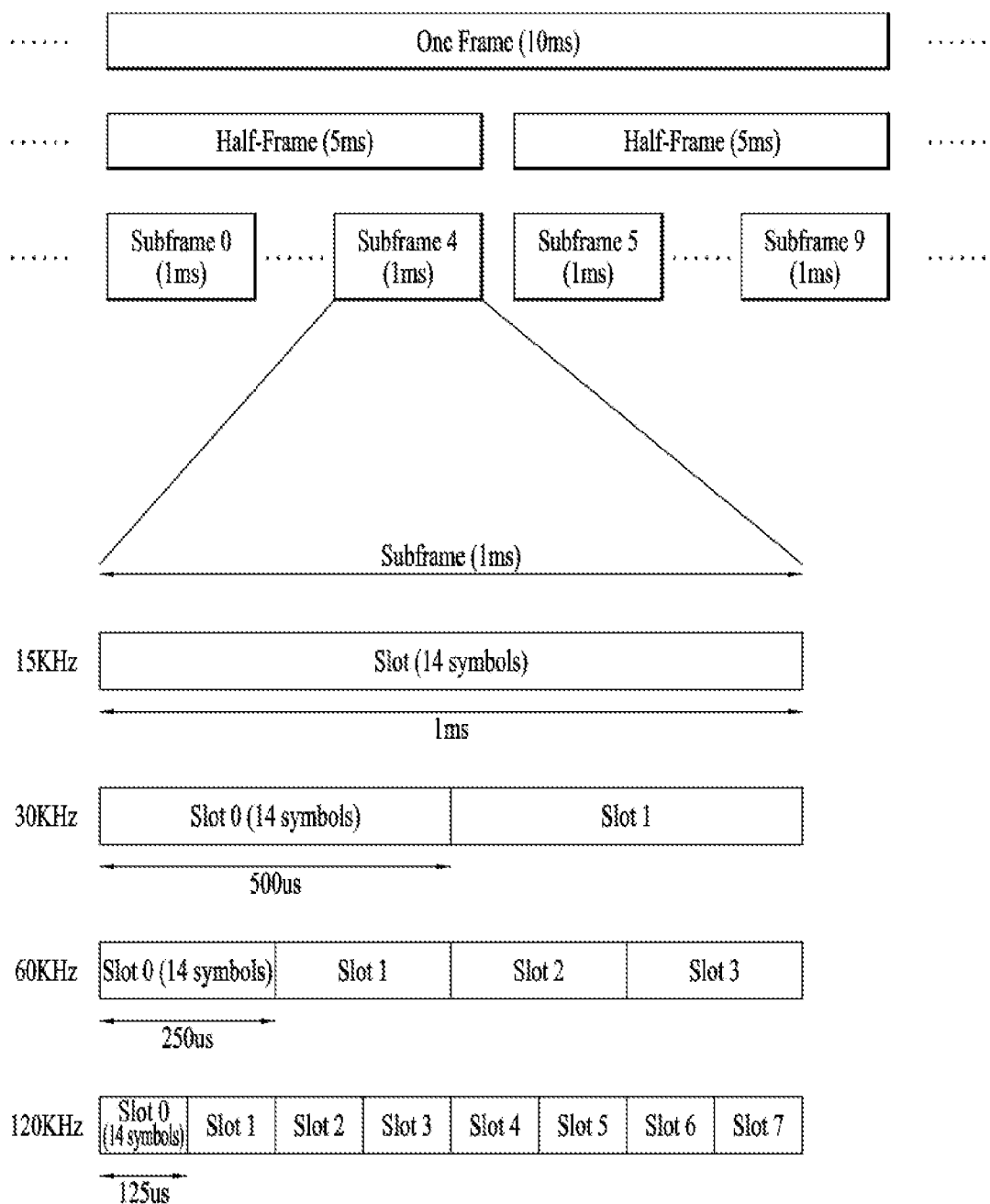
FIG. 2 illustrates a radio frame structure.

FIG. 2 illustrates a radio frame structure.

In NR, UL and DL transmissions are configured in frames. Each radio frame has a length of 10 ms and is divided into two 5-ms half-frames. Each half-frame is divided into five 1-ms subframes. A subframe is divided into one or more slots, and the number of slots in a subframe depends on a subcarrier spacing (SCS). Each slot includes 12 or 14 OFDM(A) symbols according to a cyclic prefix (CP). When a normal CP is used, each slot includes 14 OFDM symbols. When an extended CP is used, each slot includes 12 OFDM symbols. A symbol may include an OFDM symbol (or a CP-OFDM symbol) and an SC-FDMA symbol (or a discrete Fourier transform-spread-OFDM (DFT-s-OFDM) symbol).

Table 1 exemplarily illustrates that the number of symbols per slot, the number of slots per frame, and the number of slots per subframe vary according to SCSs in a normal CP case.

TABLE 1

| SCS ($15 * 2^u$) | $N_{symb}^{slot}$ | $N_{slot}^{frame,u}$ | $N_{slot}^{subframe,u}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |

TABLE 1-continued

| SCS ($15 * 2^u$) | $N_{symb}^{slot}$ | $N_{slot}^{frame,u}$ | $N_{slot}^{subframe,u}$ |
|---|---|---|---|
| 120 KHz (u = 3) | 14 | 80 | 8 |
| 240 KHz (u = 4) | 14 | 160 | 16 |

*$N_{symb}^{slot}$: number of symbols in a slot
*$N_{slot}^{frame,u}$: number of slots in a frame
*$N_{slot}^{subframe,u}$: number of slots in a subframe Table 2 illustrates that the number of symbols per slot, the number of slots per frame, and the number of slots per subframe vary according to SCSs in an extended CP case.

TABLE 2

| SCS ($15 * 2^u$) | $N_{symb}^{slot}$ | $N_{slot}^{frame,u}$ | $N_{slot}^{subframe,u}$ |
|---|---|---|---|
| 60 KHz (u = 2) | 12 | 40 | 4 |

The frame structure is merely an example, and the number of subframes, the number of slots, and the number of symbols in a frame may be changed in various manners.

In the NR system, different OFDM(A) numerologies (e.g., SCSs, CP lengths, and so on) may be configured for a plurality of cells aggregated for one UE. Accordingly, the (absolute time) duration of a time resource (e.g., a subframe, a slot, or a transmission time interval (TTI)) (for convenience, referred to as a time unit (TU)) composed of the same number of symbols may be configured differently between the aggregated cells.

In NR, various numerologies (or SCSs) may be supported to support various 5th generation (5G) services. For example, with an SCS of 15 kHz, a wide area in traditional cellular bands may be supported, while with an SCS of 30 kHz or 60 kHz, a dense urban area, a lower latency, and a wide carrier bandwidth may be supported. With an SCS of 60 kHz or higher, a bandwidth larger than 24.25 kHz may be supported to overcome phase noise.

An NR frequency band may be defined by two types of frequency ranges, FR1 and FR2. FR1 and FR2 may be configured as described in Table 3 below. FR2 may be millimeter wave (mmW).

TABLE 3

| Frequency Range designation | Corresponding frequency range | Subcarrier Spacing |
|---|---|---|
| FR1 | 450 MHz-7125 MHz | 15, 30, 60 kHz |
| FR2 | 24250 MHz-52600 MHz | 60, 120, 240 kHz |

Figure 3:
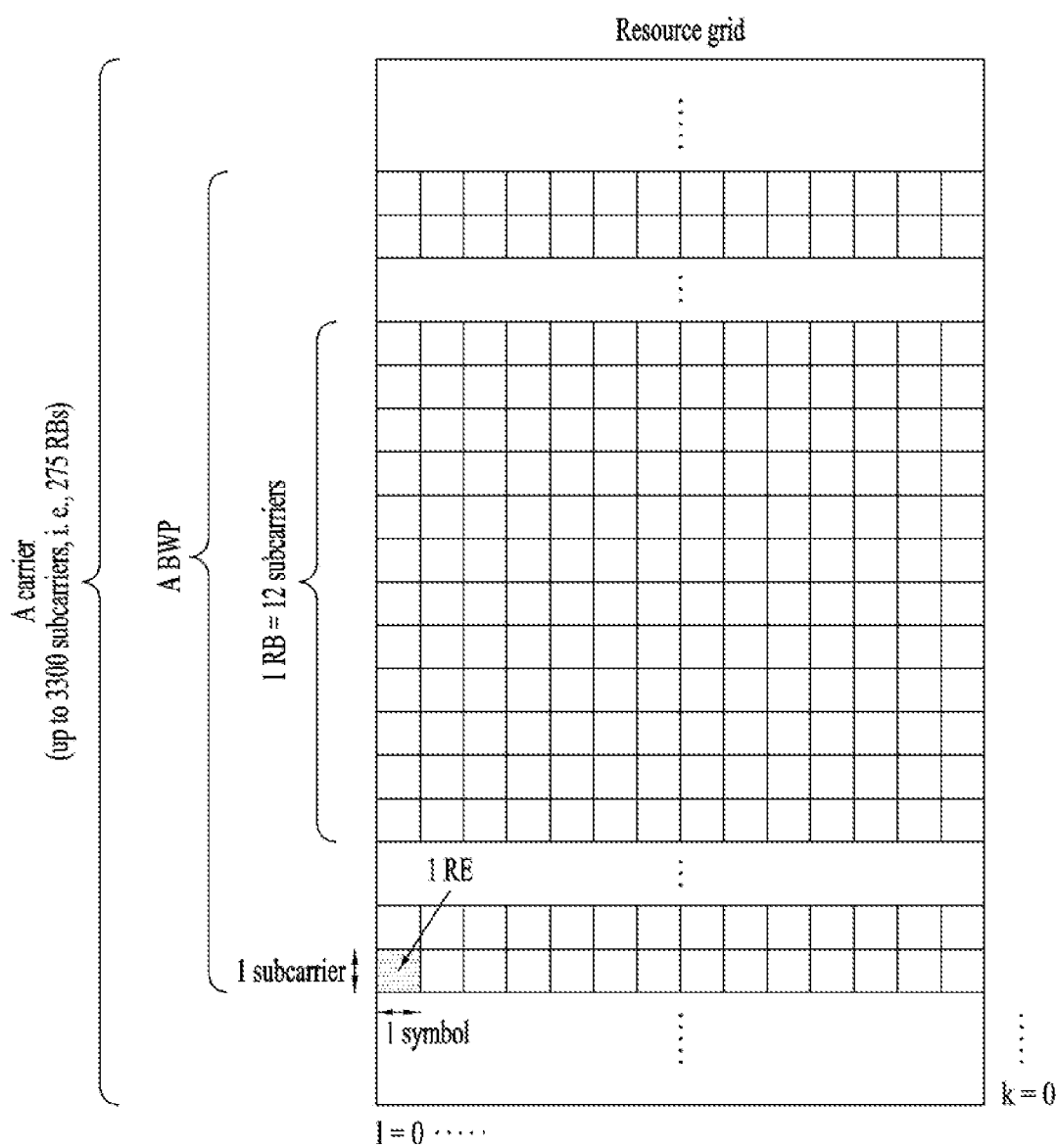
FIG. 3 illustrates a resource grid during the duration of a slot.

FIG. 3 illustrates a resource grid during the duration of one slot.

A slot includes a plurality of symbols in the time domain. For example, one slot includes 14 symbols in a normal CP case and 12 symbols in an extended CP case. A carrier includes a plurality of subcarriers in the frequency domain. A resource block (RB) may be defined by a plurality of (e.g., 12) consecutive subcarriers in the frequency domain. A bandwidth part (BWP) may be defined by a plurality of consecutive (physical) RBs ((P)RBs) in the frequency domain and correspond to one numerology (e.g., SCS, CP length, and so on). A carrier may include up to N (e.g., 5) BWPs. Data communication may be conducted in an active BWP, and only one BWP may be activated for one UE. Each element in a resource grid may be referred to as a resource element (RE), to which one complex symbol may be mapped.

Figure 4:
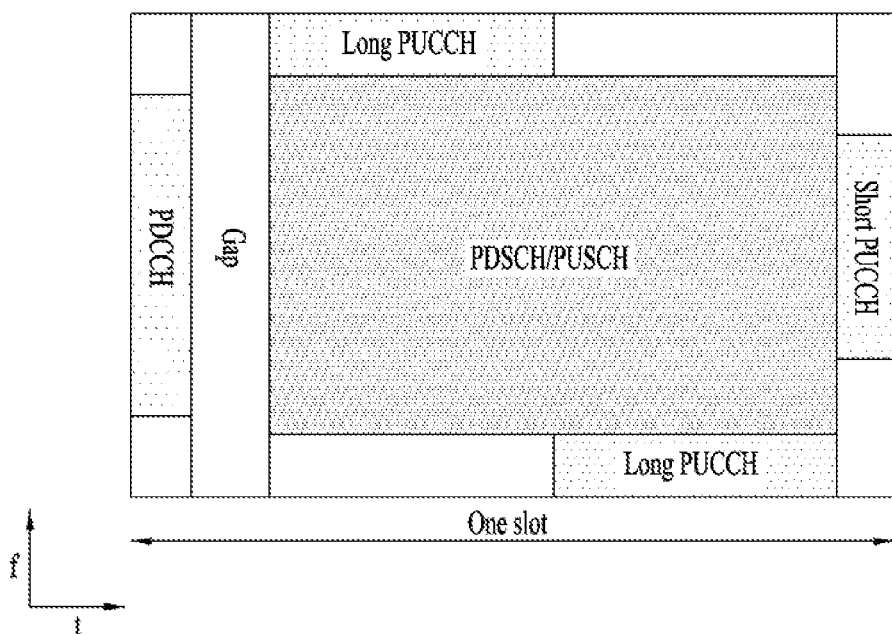
FIG. 4 illustrates exemplary mapping of physical channels in a slot.

FIG. 4 illustrates exemplary mapping of physical channels in a slot.

A DL control channel, DL or UL data, and a UL control channel may all be included in one slot. For example, the first N symbols (hereinafter, referred to as a DL control region) in a slot may be used to transmit a DL control channel, and the last M symbols (hereinafter, referred to as a UL control region) in the slot may be used to transmit a UL control channel. N and M are integers equal to or greater than 0. A resource region (hereinafter, referred to as a data region) between the DL control region and the UL control region may be used for DL data transmission or UL data transmission. A time gap for DL-to-UL or UL-to-DL switching may be defined between a control region and the data region. A PDCCH may be transmitted in the DL control region, and a PDSCH may be transmitted in the DL data region. Some symbols at the time of switching from DL to UL in a slot may be configured as the time gap.

Now, a detailed description will be given of physical channels.

The PDSCH delivers DL data (e.g., a downlink shared channel (DL-SCH) transport block (TB)) and adopts a modulation scheme such as quadrature phase shift keying (QPSK), 16-ary quadrature amplitude modulation (16 QAM), 64-ary QAM (64 QAM), or 256-ary QAM (256 QAM). A TB is encoded to a codeword. The PDSCH may deliver up to two codewords. The codewords are individually subjected to scrambling and modulation mapping, and modulation symbols from each codeword are mapped to one or more layers. An OFDM signal is generated by mapping each layer together with a DMRS to resources, and transmitted through a corresponding antenna port.

The PDCCH delivers DCI. For example, the PDCCH (i.e., DCI) may carry information about a transport format and resource allocation of a DL shared channel (DL-SCH), resource allocation information of an uplink shared channel (UL-SCH), paging information on a paging channel (PCH), system information on the DL-SCH, information on resource allocation of a higher-layer control message such as an RAR transmitted on a PDSCH, a transmit power control command, information about activation/release of configured scheduling, and so on. The DCI includes a cyclic redundancy check (CRC). The CRC is masked with various identifiers (IDs) (e.g. a radio network temporary identifier (RNTI)) according to an owner or usage of the PDCCH. For example, if the PDCCH is for a specific UE, the CRC is masked by a UE ID (e.g., cell-RNTI (C-RNTI)). If the PDCCH is for a paging message, the CRC is masked by a paging-RNTI (P-RNTI). If the PDCCH is for system information (e.g., a system information block (SIB)), the CRC is masked by a system information RNTI (SI-RNTI). When the PDCCH is for an RAR, the CRC is masked by a random access-RNTI (RA-RNTI).

The PDCCH uses a fixed modulation scheme (e.g., QPSK). One PDCCH includes 1, 2, 4, 8, or 16 control channel elements (CCEs) according to its aggregation level (AL). One CCE includes 6 resource element groups (REGs), each REG being defined by one OFDM symbol by one (P)RB.

The PDCCH is transmitted in a control resource set (CORESET). The CORESET corresponds to a set of physical resources/parameters used to deliver the PDCCH/DCI in a BWP. For example, the CORESET is defined as a set of REGs with a given numerology (e.g., an SCS, a CP length, or the like). The CORESET may be configured by system information (e.g., a master information block (MIB)) or UE-specific higher-layer signaling (e.g., RRC signaling).

For example, the following parameters/information may be used to configure a CORESET, and a plurality of CORESETs may overlap with each other in the time/frequency domain.

controlResourceSetId: indicates the ID of a CORESET.

frequencyDomainResources: indicates the frequency area resources of the CORESET. The frequency area resources are indicated by a bitmap, and each bit of the bitmap corresponds to an RB group (i.e., six consecutive RBs). For example, the most significant bit (MSB) of the bitmap corresponds to the first RB group of a BWP. An RB group corresponding to a bit set to 1 is allocated as frequency area resources of the CORESET.

duration: indicates the time area resources of the CORESET. It indicates the number of consecutive OFDMA symbols in the CORESET. For example, the duration is set to one of 1 to 3.

cce-REG-MappingType: indicates a CCE-to-REG mapping type. An interleaved type and a non-interleaved type are supported.

precoderGranularity: indicates a precoder granularity in the frequency domain.

tci-StatesPDCCH: provides information indicating a transmission configuration indication (TCI) state for the PDCCH (e.g., TCI-StateID). The TCI state is used to provide the quasi-co-location relation between DL RS(s) in an RS set (TCI-state) and PDCCH DMRS ports.

tci-PresentInDCI: indicates whether a TCI field is included in DCI.

pdcch-DMRS-ScramblingID: provides information used for initialization of a PDCCH DMRS scrambling sequence.

To receive the PDCCH, the UE may monitor (e.g., blind-decode) a set of PDCCH candidates in the CORESET. The PDCCH candidates are CCE(s) that the UE monitors for PDCCH reception/detection. The PDCCH monitoring may be performed in one or more CORESETs in an active DL BWP on each active cell configured with PDCCH monitoring. A set of PDCCH candidates monitored by the UE is defined as a PDCCH search space (SS) set. The SS set may be a common search space (CSS) set or a UE-specific search space (USS) set.

Table 4 lists exemplary PDCCH SSs.

TABLE 4

| Type | Search Space | RNTI | Use Case |
|---|---|---|---|
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |
| Type2-PDCCH | Common | P-RNTI on a primary cell | Paging Decoding |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| UE Specific | UE Specific | C-RNTI, or MCS-C-RNTI, or CS-RNTI(s) | User specific PDSCH decoding |

The SS set may be configured by system information (e.g., MIB) or UE-specific higher-layer (e.g., RRC) signaling. S or fewer SS sets may be configured in each DL BWP of a serving cell. For example, the following parameters/information may be provided for each SS set. Each SS set may be associated with one CORESET, and each CORESET configuration may be associated with one or more SS sets.

searchSpaceId: indicates the ID of the SS set.

controlResourceSetId: indicates a CORESET associated with the SS set.

monitoringSlotPeriodicityAndOffset: indicates a PDCCH monitoring periodicity (in slots) and a PDCCH monitoring offset (in slots).

monitoringSymbolsWithinSlot: indicates the first OFDMA symbol(s) for PDCCH monitoring in a slot configured with PDCCH monitoring. The OFDMA symbols are indicated by a bitmap and each bit of the bitmap corresponds to one OFDM symbol in the slot. The MSB of the bitmap corresponds to the first OFDM symbol of the slot. OFDMA symbol(s) corresponding to bit(s) set to 1 corresponds to the first symbol(s) of the CORESET in the slot.

nrofCandidates: indicates the number of PDCCH candidates (e.g., one of 0, 1, 2, 3, 4, 5, 6, and 8) for each AL={1, 2, 4, 8, 16}.

searchSpaceType: indicates whether the SS type is CSS or USS.

DCI format: indicates the DCI format of PDCCH candidates.

The UE may monitor PDCCH candidates in one or more SS sets in a slot based on a CORESET/SS set configuration. An occasion (e.g., time/frequency resources) in which the PDCCH candidates should be monitored is defined as a PDCCH (monitoring) occasion. One or more PDCCH (monitoring) occasions may be configured in a slot.

Table 5 illustrates exemplary DCI formats transmitted on the PDCCH.

TABLE 5

| DCI format | Usage |
| --- | --- |
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used to schedule a TB-based (or TB-level) PUSCH, and DCI format 0_1 may be used to schedule a TB-based (or TB-level) PUSCH or a code block group (CBG)-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH (DL grant DCI). DCI format 0_0/0_1 may be referred to as UL grant DCI or UL scheduling information, and DCI format 1_0/1_1 may be referred to as DL grant DCI or DL scheduling information. DCI format 2_0 is used to deliver dynamic slot format information (e.g., a dynamic slot format indicator (SFI)) to a UE, and DCI format 2_1 is used to deliver DL pre-emption information to a UE. DCI format 2_0 and/or DCI format 2_1 may be delivered to a corresponding group of UEs on a group common PDCCH which is a PDCCH directed to a group of UEs.

DCI format 0_0 and DCI format 1_0 may be referred to as fallback DCI formats, whereas DCI format 0_1 and DCI format 1_1 may be referred to as non-fallback DCI formats. In the fallback DCI formats, a DCI size/field configuration is maintained to be the same irrespective of a UE configuration. In contrast, the DCI size/field configuration varies depending on a UE configuration in the non-fallback DCI formats.

The PUCCH delivers uplink control information (UCI). The UCI includes the following information.

SR: information used to request UL-SCH resources.

HARQ-ACK: a response to a DL data packet (e.g., codeword) on the PDSCH. An HARQ-ACK indicates whether the DL data packet has been successfully received. In response to a single codeword, a 1-bit of HARQ-ACK may be transmitted. In response to two codewords, a 2-bit HARQ-ACK may be transmitted. The HARQ-ACK response includes positive ACK (simply, ACK), negative ACK (NACK), discontinuous transmission (DTX) or NACK/DTX. The term HARQ-ACK is interchangeably used with HARQ ACK/NACK and ACK/NACK.

CSI: feedback information for a DL channel. Multiple input multiple output (MIMO)-related feedback information includes an RI and a PMI.

Table 6 illustrates exemplary PUCCH formats. PUCCH formats may be divided into short PUCCHs (Formats 0 and 2) and long PUCCHs (Formats 1, 3, and 4) based on PUCCH transmission durations.

TABLE 6

| PUCCH format | Length in OFDM symbols $N_{symb}^{PUCCH}$ | Number of bits | Usage | Etc |
| --- | --- | --- | --- | --- |
| 0 | 1-2 | ≤2 | HARQ, SR | Sequence selection |
| 1 | 4-14 | ≤2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM (no UE multiplexing) |
| 4 | 4-14 | >2 | HARQ, CSI, [SR] | DFT-s-OFDM (Pre DFT OCC) |

PUCCH format 0 conveys UCI of up to 2 bits and is mapped in a sequence-based manner, for transmission. Specifically, the UE transmits specific UCI to the BS by transmitting one of a plurality of sequences on a PUCCH of PUCCH format 0. Only when the UE transmits a positive SR, the UE transmits the PUCCH of PUCCH format 0 in PUCCH resources for a corresponding SR configuration.

PUCCH format 1 conveys UCI of up to 2 bits and modulation symbols of the UCI are spread with an orthogonal cover code (OCC) (which is configured differently whether frequency hopping is performed) in the time domain. The DMRS is transmitted in a symbol in which a modulation symbol is not transmitted (i.e., transmitted in time division multiplexing (TDM)).

PUCCH format 2 conveys UCI of more than 2 bits and modulation symbols of the DCI are transmitted in frequency division multiplexing (FDM) with the DMRS. The DMRS is located in symbols #1, #4, #7, and #10 of a given RB with a density of ⅓. A pseudo noise (PN) sequence is used for a DMRS sequence. For 2-symbol PUCCH format 2, frequency hopping may be activated.

PUCCH format 3 does not support UE multiplexing in the same PRBS, and conveys UCI of more than 2 bits. In other words, PUCCH resources of PUCCH format 3 do not include an OCC. Modulation symbols are transmitted in TDM with the DMRS.

PUCCH format 4 supports multiplexing of up to 4 UEs in the same PRBS, and conveys UCI of more than 2 bits. In other words, PUCCH resources of PUCCH format 3 include an OCC. Modulation symbols are transmitted in TDM with the DMRS.

The PUSCH delivers UL data (e.g., UL-shared channel transport block (UL-SCH TB)) and/or UCI based on a CP-OFDM waveform or a DFT-s-OFDM waveform. When the PUSCH is transmitted in the DFT-s-OFDM waveform, the UE transmits the PUSCH by transform precoding. For example, when transform precoding is impossible (e.g., disabled), the UE may transmit the PUSCH in the CP-OFDM waveform, while when transform precoding is possible (e.g., enabled), the UE may transmit the PUSCH in the CP-OFDM or DFT-s-OFDM waveform. A PUSCH transmission may be dynamically scheduled by a UL grant in DCI, or semi-statically scheduled by higher-layer (e.g., RRC) signaling (and/or Layer 1 (L1) signaling such as a PDCCH) (configured scheduling or configured grant). The PUSCH transmission may be performed in a codebook-based or non-codebook-based manner.

On DL, the BS may dynamically allocate resources for DL transmission to the UE by PDCCH(s) (including DCI format 1_0 or DCI format 1_1). Further, the BS may indicate to a specific UE that some of resources pre-scheduled for the UE have been pre-empted for signal transmission to another UE, by PDCCH(s) (including DCI format 2_1). Further, the BS may configure a DL assignment periodicity by higher-layer signaling and signal activation/deactivation of a configured DL assignment by a PDCCH in a semi-persistent scheduling (SPS) scheme, to provide a DL assignment for an initial HARQ transmission to the UE. When a retransmission for the initial HARQ transmission is required, the BS explicitly schedules retransmission resources through a PDCCH. When a DCI-based DL assignment collides with an SPS-based DL assignment, the UE may give priority to the DCI-based DL assignment.

Similarly to DL, for UL, the BS may dynamically allocate resources for UL transmission to the UE by PDCCH(s) (including DCI format 0_0 or DCI format 0_1). Further, the BS may allocate UL resources for initial HARQ transmission to the UE based on a configured grant (CG) method (similarly to SPS). Although dynamic scheduling involves a PDCCH for a PUSCH transmission, a configured grant does not involve a PDCCH for a PUSCH transmission. However, UL resources for retransmission are explicitly allocated by PDCCH(s). As such, an operation of preconfiguring UL resources without a dynamic grant (DG) (e.g., a UL grant through scheduling DCI) by the BS is referred to as a "CG". Two types are defined for the CG.

Type 1: a UL grant with a predetermined periodicity is provided by higher-layer signaling (without L1 signaling).

Type 2: the periodicity of a UL grant is configured by higher-layer signaling, and activation/deactivation of the CG is signaled by a PDCCH, to provide the UL grant.

Figure 5:
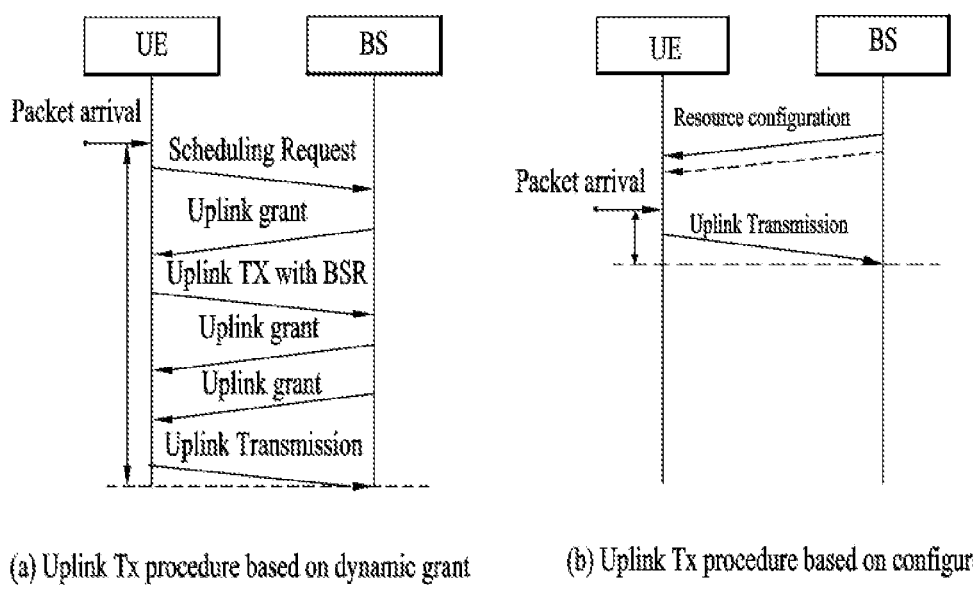
FIG. 5 illustrates exemplary uplink (UL) transmission operations of a user equipment (UE)

FIG. 5 illustrates exemplary UL transmission operations of a UE. The UE may transmit an intended packet based on a DG (FIG. 5(a)) or based on a CG (FIG. 5(b)).

Resources for CGs may be shared between a plurality of UEs. A UL signal transmission based on a CG from each UE may be identified by time/frequency resources and an RS parameter (e.g., a different cyclic shift or the like). Therefore, when a UE fails in transmitting a UL signal due to signal collision, the BS may identify the UE and explicitly transmit a retransmission grant for a corresponding TB to the UE.

K repeated transmissions including an initial transmission are supported for the same TB by a CG. The same HARQ process ID is determined for K times repeated UL signals based on resources for the initial transmission. The redundancy versions (RVs) of a K times repeated TB have one of the patterns {0, 2, 3, 1}, {0, 3, 0, 3}, and {0, 0, 0, 0}.

Figure 6:
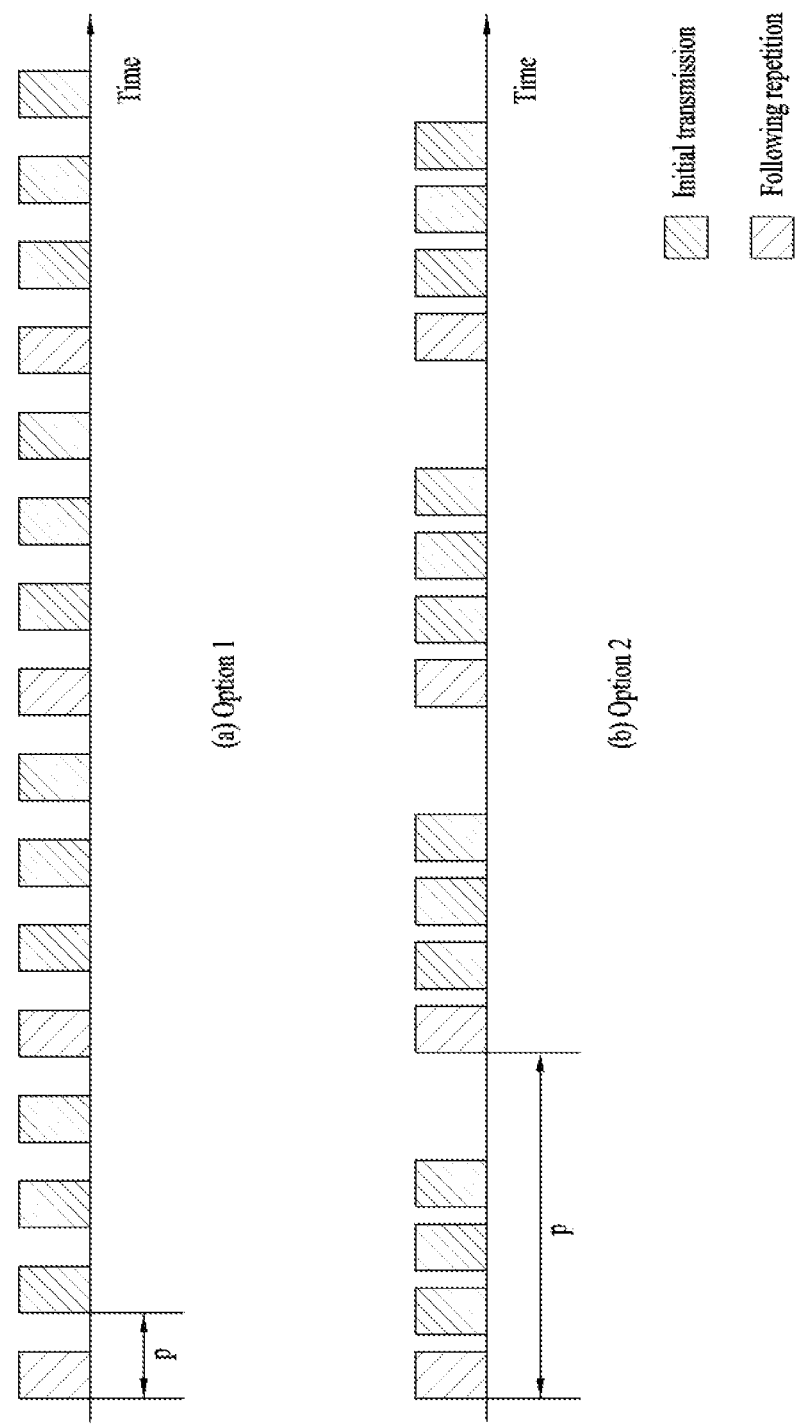
FIG. 6 illustrates exemplary repeated transmissions based on a configured grant.

FIG. 6 illustrates exemplary repeated transmissions based on a CG.

The UE performs repeated transmissions until one of the following conditions is satisfied:

AUL grant for the same TB is successfully received;

The repetition number of the TB reaches K; and (In Option 2) the ending time of a period P is reached.

Similarly to licensed-assisted access (LAA) in the legacy 3GPP LTE system, use of an unlicensed band for cellular communication is also under consideration in a 3GPP NR system. Unlike LAA, a stand-along (SA) operation is aimed in an NR cell of an unlicensed band (hereinafter, referred to as NR unlicensed cell (UCell)). For example, PUCCH, PUSCH, and PRACH transmissions may be supported in the NR UCell.

In an NR system to which various embodiments of the present disclosure are applicable, up to 400 MHz per component carrier (CC) may be allocated/supported. When a UE operating in such a wideband CC always operates with a radio frequency (RF) module turned on for the entire CC, battery consumption of the UE may increase.

Alternatively, considering various use cases (e.g., eMBB, URLLC, mMTC, and so on) operating within a single wideband CC, a different numerology (e.g., SCS) may be supported for each frequency band within the CC.

Alternatively, each UE may have a different maximum bandwidth capability.

In this regard, the BS may indicate to the UE to operate only in a partial bandwidth instead of the total bandwidth of the wideband CC. The partial bandwidth may be defined as a bandwidth part (BWP).

A BWP may be a subset of contiguous RBs on the frequency axis. One BWP may correspond to one numerology (e.g., SCS, CP length, slot/mini-slot duration, and so on).

The BS may configure multiple BWPs in one CC configured for the UE. For example, the BS may configure a BWP occupying a relatively small frequency area in a PDCCH monitoring slot, and schedule a PDSCH indicated (or scheduled) by a PDCCH in a larger BWP. Alternatively, when UEs are concentrated on a specific BWP, the BS may configure another BWP for some of the UEs, for load balancing. Alternatively, the BS may exclude some spectrum of the total bandwidth and configure both-side BWPs of the cell in the same slot in consideration of frequency-domain inter-cell interference cancellation between neighboring cells.

The BS may configure at least one DL/UL BWP for a UE associated with the wideband CC, activate at least one of DL/UL BWP(s) configured at a specific time point (by L1 signaling (e.g., DCI), MAC signaling, or RRC signaling), and indicate switching to another configured DL/UL BWP (by L1 signaling, MAC signaling, or RRC signaling). Further, upon expiration of a timer value (e.g., a BWP inactivity timer value), the UE may switch to a predetermined DL/UL BWP. The activated DL/UL BWP may be referred to as an active DL/UL BWP. During initial access or before an RRC connection setup, the UE may not receive a configuration for a DL/UL BWP from the BS. A DL/UL BWP that the UE assumes in this situation is defined as an initial active DL/UL BWP.

EMBODIMENTS OF THE PRESENT DISCLOSURE

Figure 7:
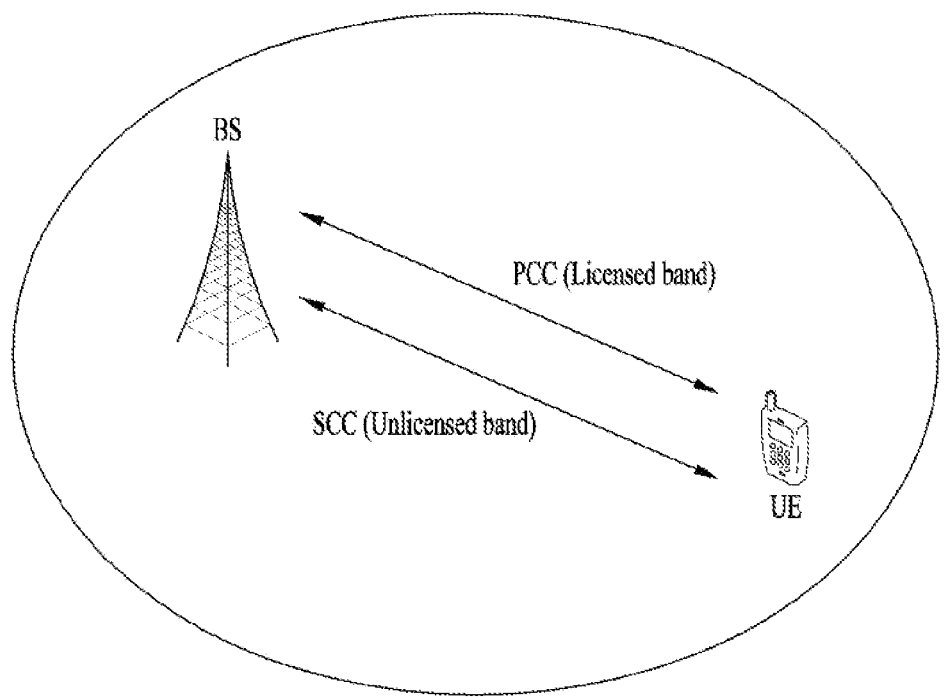
FIG. 7 illustrates a wireless communication system supporting an unlicensed band.
Figure 7:
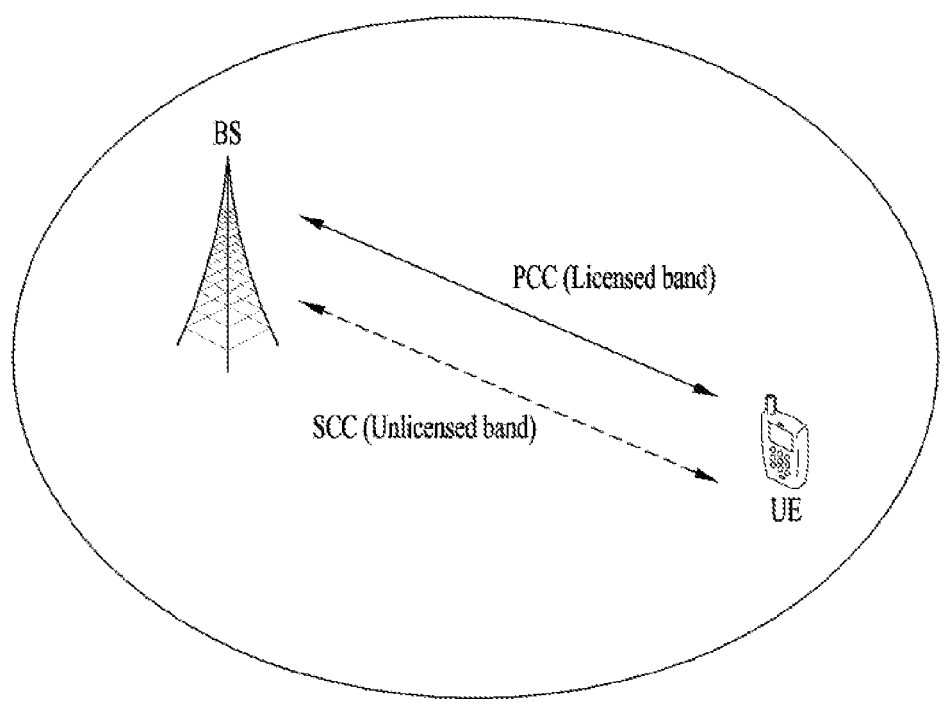

FIG. 7 illustrates an exemplary wireless communication system supporting an unlicensed band applicable to the present disclosure.

In the following description, a cell operating in a licensed band (L-band) is defined as an L-cell, and a carrier of the L-cell is defined as a (DL/UL) LCC. A cell operating in an unlicensed band (U-band) is defined as a U-cell, and a carrier of the U-cell is defined as a (DL/UL) UCC. The carrier/carrier-frequency of a cell may refer to the operating frequency (e.g., center frequency) of the cell. A cell/carrier (e.g., CC) is commonly called a cell.

When a BS and a UE transmit and receive signals on carrier-aggregated LCC and UCC as illustrated in FIG. 7(a), the LCC and the UCC may be configured as a primary CC (PCC) and a secondary CC (SCC), respectively. The BS and the UE may transmit and receive signals on one UCC or on a plurality of carrier-aggregated UCCs as illustrated in FIG. 7(b). In other words, the BS and UE may transmit and receive signals only on UCC(s) without using any LCC. For an SA operation, PRACH, PUCCH, PUSCH, and SRS transmissions may be supported on a UCell.

Signal transmission and reception operations in an unlicensed band as described in the present disclosure may be applied to the afore-mentioned deployment scenarios (unless specified otherwise).

Unless otherwise noted, the definitions below are applicable to the following terminologies used in the present disclosure.

Channel: a carrier or a part of a carrier composed of a contiguous set of RBs in which a channel access procedure (CAP) is performed in a shared spectrum.

Channel access procedure (CAP): a procedure of assessing channel availability based on sensing before signal transmission in order to determine whether other communication node(s) are using a channel. A basic sensing unit is a sensing slot with a duration of Tsl=9 μs. The BS or the UE senses the slot during a sensing slot duration. When power detected for at least 4 μs within the sensing slot duration is less than an energy detection threshold XThresh, the sensing slot duration Tsl is be considered to be idle. Otherwise, the sensing slot duration Tsl is considered to be busy. CAP may also be called listen before talk (LBT).

Channel occupancy: transmission(s) on channel(s) from the BS/UE after a CAP.

Channel occupancy time (COT): a total time during which the BS/UE and any BS/UE(s) sharing channel occupancy performs transmission(s) on a channel after a CAP. Regarding COT determination, if a transmission gap is less than or equal to 25 μs, the gap duration may be counted in a COT. The COT may be shared for transmission between the BS and corresponding UE(s).

DL transmission burst: a set of transmissions without any gap greater than 16 μs from the BS. Transmissions from the BS, which are separated by a gap exceeding 16 μs are considered as separate DL transmission bursts. The BS may perform transmission(s) after a gap without sensing channel availability within a DL transmission burst.

UL transmission burst: a set of transmissions without any gap greater than 16 μs from the UE. Transmissions from the UE, which are separated by a gap exceeding 16 μs are considered as separate UL transmission bursts. The UE may perform transmission(s) after a gap without sensing channel availability within a DL transmission burst.

Discovery burst: a DL transmission burst including a set of signal(s) and/or channel(s) confined within a window and associated with a duty cycle. The discovery burst may include transmission(s) initiated by the BS, which includes a PSS, an SSS, and a cell-specific RS (CRS) and further includes a non-zero power CSI-RS. In the NR system, the discover burst includes may include transmission(s) initiated by the BS, which includes at least an SS/PBCH block and further includes a CORESET for a PDCCH scheduling a PDSCH carrying SIB1, the PDSCH carrying SIB1, and/or a non-zero power CSI-RS.

Figure 8:
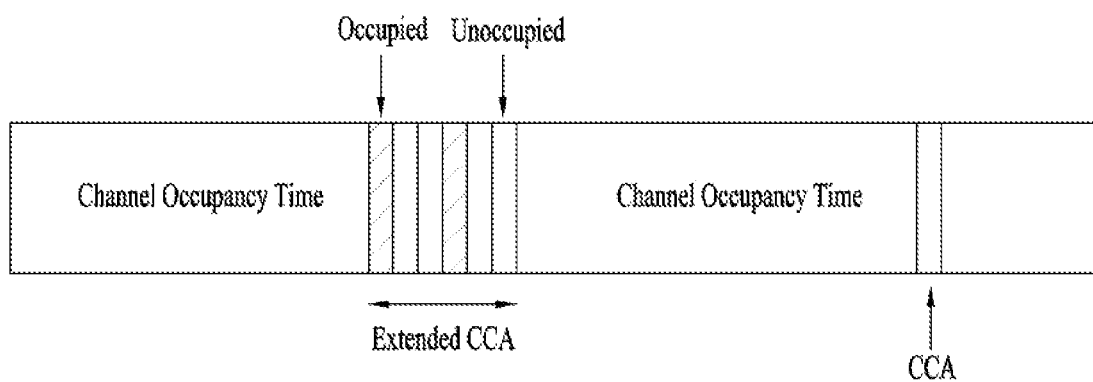
FIG. 8 illustrates an exemplary method of occupying resources in an unlicensed band.

FIG. 8 illustrates an exemplary method of occupying resources in an unlicensed band.

Referring to FIG. 8, a communication node (e.g., a BS or a UE) operating in an unlicensed band should determine whether other communication node(s) is using a channel, before signal transmission. For this purpose, the communication node may perform a CAP to access channel(s) on which transmission(s) is to be performed in the unlicensed band. The CAP may be performed based on sensing. For example, the communication node may determine whether other communication node(s) is transmitting a signal on the channel(s) by carrier sensing (CS) before signal transmission. Determining that other communication node(s) is not transmitting a signal is defined as confirmation of clear channel assessment (CCA). In the presence of a CCA threshold (e.g., Xthresh) which has been predefined or configured by higher-layer (e.g., RRC) signaling, the communication node may determine that the channel is busy, when detecting energy higher than the CCA threshold in the channel. Otherwise, the communication node may determine that the channel is idle. When determining that the channel is idle, the communication node may start to transmit a signal in the unlicensed band. CAP may be replaced with LBT.

Table 7 describes an exemplary CAP supported in NR-U.

TABLE 7

|    | Type | Explanation |
|----|------|-------------|
| DL | Type 1 CAP | CAP with random backoff<br>time duration spanned by the sensing slots that are sensed to be idle before a downlink transmission(s) is random |
|    | Type 2 CAP | CAP without random backoff |
|    | Type 2A, 2B, 2C | time duration spanned by sensing slot that are sensed to be idle before a downlink transmission(s) is deterministic |
| UL | Type 1 CAP | CAP with random backoff<br>time duration spanned by the sensing slots that are sensed to be idle before a downlink transmission(s) is random |
|    | Type 2 CAP | CAP without random backoff |
|    | Type 2A, 2B, 2C | time duration spanned by sensing slots that are sensed to be idle before a downlink transmission(s) is deterministic |

In a wireless communication system supporting an unlicensed band, one cell (or carrier (e.g., CC)) or BWP configured for a UE may be a wideband having a larger bandwidth (BW) than in legacy LTE. However, a BW requiring CCA based on an independent LBT operation may be limited according to regulations. Let a subband (SB) in which LBT is individually performed be defined as an LBT-SB. Then, a plurality of LBT-SBs may be included in one wideband cell/BWP. A set of RBs included in an LBT-SB may be configured by higher-layer (e.g., RRC) signaling. Accordingly, one or more LBT-SBs may be included in one cell/BWP based on (i) the BW of the cell/BWP and (ii) RB set allocation information.

A plurality of LBT-SBs may be included in the BWP of a cell (or carrier). An LBT-SB may be, for example, a 20-MHz band. The LBT-SB may include a plurality of contiguous (P)RBs in the frequency domain, and thus may be referred to as a (P)RB set.

A UE performs a Type 1 or Type 2 CAP for a UL signal transmission in an unlicensed band. In general, the UE may perform a CAP (e.g., Type 1 or Type 2) configured by a BS, for a UL signal transmission. For example, CAP type indication information may be included in a UL grant (e.g., DCI format 0_0 or DCI format 0_1) that schedules a PUSCH transmission.

In the Type 1 UL CAP, the length of a time period spanned by sensing slots sensed as idle before transmission(s) is random. The Type 1 UL CAP may be applied to the following transmissions.

PUSCH/SRS transmission(s) scheduled and/or configured by BS

PUCCH transmission(s) scheduled and/or configured by BS

Transmission(s) related to random access procedure (RAP)

Figure 9:
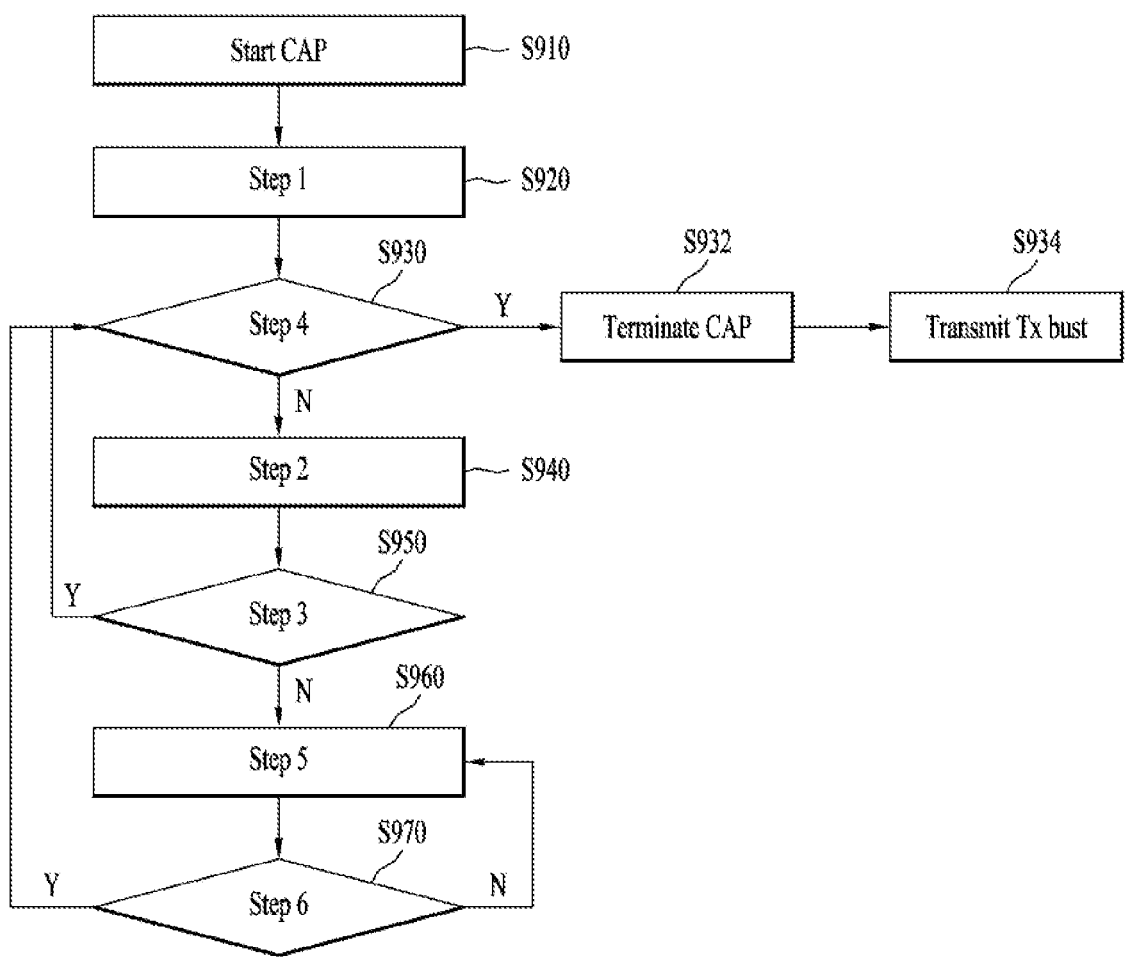
FIG. 9 illustrates an exemplary channel access procedure of a UE for UL signal transmission in an unlicensed band applicable to the present disclosure.

FIG. 9 illustrates a Type 1 CAP among CAPs of a UE for a UL signal transmission in an unlicensed band applicable to the present disclosure.

Referring to FIG. 9, the UE may sense whether a channel is idle for a sensing slot duration in a defer duration Td. After a counter N is decremented to 0, the UE may perform a transmission (S934). The counter N is adjusted by sensing the channel for additional slot duration(s) according to the following procedure.

Step 1) Set N=Ninit where Ninit is a random number uniformly distributed between 0 and CWp, and go to step 4 (S920).

Step 2) If N>0 and the UE chooses to decrement the counter, set N=N−1 (S940).

Step 3) Sense the channel for an additional slot duration, and if the additional slot duration is idle (Y), go to step 4. Else (N), go to step 5 (S950).

Step 4) If N=0 (Y) (S930), stop CAP (S932). Else (N), go to step 2.

Step 5) Sense the channel until a busy sensing slot is detected within the additional defer duration Td or all slots of the additional defer duration Td are sensed as idle (S960).

Step 6) If the channel is sensed as idle for all slot durations of the additional defer duration Td (Y), go to step 4. Else (N), go to step 5 (S970).

Table 8 illustrates that mp, a minimum CW, a maximum CW, a maximum channel occupancy time (MCOT), and an allowed CW size applied to a CAP vary according to channel access priority classes.

TABLE 8

| Channel Access Priority Class (p) | $m_p$ | $CW_{min,p}$ | $CW_{max,p}$ | $T_{ulmcot,p}$ | allowed $CW_p$ sizes |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 or 10 ms | {15, 31, 63, 127, 255, 511, 1023} |
| 4 | 7 | 15 | 1023 | 6 or 10 ms | {15, 31, 63, 127, 255, 511, 1023} |

The defer duration $T_d$ includes a duration $T_f$ (16 μs) immediately followed by $m_p$ consecutive slot durations where each slot duration $T_{sl}$ is 9 μs, and $T_f$ includes a sensing slot duration $T_{sl}$ at the start of the 16-μs duration.

$CW_{min,p} <= CW_p <= CW_{max,p}$. $CW_p$ is set to $CW_{min,p}$, and may be updated before Step 1 based on an explicit/implicit reception response to a previous UL burst (e.g., PUSCH) (CW size update). For example, $CW_p$ may be initialized to $CW_{min,p}$ based on an explicit/implicit reception response to the previous UL burst, may be increased to the next higher allowed value, or may be maintained to be an existing value.

In the Type 2 UL CAP, the length of a time period spanned by sensing slots sensed as idle before transmission(s) is deterministic. Type 2 UL CAPs are classified into Type 2A UL CAP, Type 2B UL CAP, and Type 2C UL CAP. In the Type 2A UL CAP, the UE may transmit a signal immediately after the channel is sensed as idle during at least a sensing duration $T_{short\_dl}$ (=25 μs). $T_{short\_dl}$ includes a duration $T_f$ (=16 μs) and one immediately following sensing slot duration. In the Type 2A UL CAP, $T_f$ includes a sensing slot at the start of the duration. In the Type 2B UL CAP, the UE may transmit a signal immediately after the channel is sensed as idle during a sensing slot duration $T_f$ (=16 μs). In the Type 2B UL CAP, $T_f$ includes a sensing slot within the last 9 μs of the duration. In the Type 2C UL CAP, the UE does not sense a channel before a transmission.

The present disclosure proposes a method of indicating an LBT type and a PUSCH starting position, for UL transmission scheduling, and a method of performing UL transmission based on the indicated LBT type and PUSCH starting position, in a wireless communication system including a BS and a UE in an unlicensed band. The present disclosure also proposes a method of configuring a reference resource, which is referred to when a contention window size (CWS) is adjusted, by receiving a result of a PDSCH or PUSCH transmission through feedback.

To allow the UE to transmit UL data in the unlicensed band, the BS should succeed in an LBT operation to transmit a UL grant in the unlicensed band, and the UE should also succeed in an LBT operation to transmit the UL data. That is, only when both of the BS and the UE succeed in their LBT operations, the UE may attempt the UL data transmission. Further, because a delay of at least 4 msec is involved between a UL grant and scheduled UL data in the LTE system, earlier access from another transmission node coexisting in the unlicensed band during the time period may defer the scheduled UL data transmission of the UE. In this context, a method of increasing the efficiency of UL data transmission in an unlicensed band is under discussion.

In LTE LAA, the BS may inform the UE of an autonomous uplink (AUL) subframe or slot for autonomous UL transmission, in which the UE may transmit UL data without receiving a UL grant, through an X-bit bitmap (e.g., X=40 bits).

When autonomous transmission activation is indicated to the UE, the UE may transmit UL data in a subframe or slot indicated through a related bitmap even without receiving the UL grant. Upon transmitting a PDSCH to the UE, the BS also transmits a PDCCH, which is scheduling information required for decoding. Likewise, upon transmitting a PUSCH on AUL to the BS, the UE also transmits AUL UCI, which is information required when the BS decodes the PUSCH. The AUL UCI includes information needed to receive an AUL PUSCH, such as a HARQ ID, a new data indicator (NDI), a redundancy version (RV), an AUL subframe starting position, and an AUL subframe ending position, and information for sharing a UE-initiated COT with the BS. "Sharing a UE-initiated COT with the BS" means an operation of assigning a part of a channel occupied by the UE through random backoff-based category 4 LBT (or Type 1 CAP) to the BS and transmitting a PDCCH (and a PDSCH) on the channel by the BS, when the channel is idle as a result of one-shot LBT of 25 μsec (based on a timing gap resulting from the UE's emptying of the last symbol).

To support a UL transmission having a relatively high reliability and a relatively low time delay, NR also supports CG type 1 and CG type 2 in which the BS preconfigures time, frequency, and code resources for the UE by higher-layer signaling (e.g., RRC signaling) or both of higher-layer signaling and L1 signaling (e.g., DCI). Without receiving a UL grant from the BS, the UE may perform a UL transmission in resources configured with type 1 or type 2. In type 1, the periodicity of a CG, an offset from SFN=0, time/frequency resource allocation, a repetition number, a DMRS parameter, an MCS/TB size (TBS), a power control parameter, and so on are all configured only by higher-layer signaling such as RRC signaling, without L1 signaling. Type 2 is a scheme of configuring the periodicity of a CG and a power control parameter by higher-layer signaling such as RRC signaling and indicating information about the remaining resources (e.g., the offset of an initial transmission timing, time/frequency resource allocation, a DMRS parameter, and an MCS/TBS) by activation DCI as L1 signaling.

AUL of LTE AAA and a CG of NR show a big difference in terms of a method of transmitting HARQ-ACK feedback for a PUSCH that the UE has transmitted without receiving a UL grant and in terms of the presence or absence of UCI transmitted along with the PUSCH. While a HARQ process is determined by an equation of a symbol index, a symbol periodicity, and the number of HARQ processes in the CG of NR, explicit HARQ-ACK feedback information is transmitted in AUL downlink feedback information (AUL-DFI) in LTE AAA. Further, in LTE AAA, UCI including information such as a HARQ ID, an NDI, and an RV is also transmitted in AUL UCI whenever AUL PUSCH transmission is performed. In the case of the CG of NR, the BS identifies the UE by time/frequency resources and DMRS resources used for PUSCH transmission, whereas in the case of LTE AAA, the BS identifies the UE by a UE ID explicitly included in the AUL UCI transmitted together with the PUSCH as well as the DMRS resources.

Before a description of proposed methods, NR-based channel access schemes for an unlicensed band used in the present disclosure are classified as follows.

Category 1 (Cat-1): the next transmission immediately follows the previous transmission after a switching gap within a COT, and the switching gap is shorter than 16 μs, including even a transceiver turn-around time. Cat-1 LBT may correspond to the above-described Type 2C CAP.

Category 2 (Cat-2): an LBT method without backoff. Once a channel is confirmed to be idle during a specific time period shortly before transmission, the transmission may be performed immediately. Cat-2 LBT may be subdivided according to the length of a minimum sensing duration required for channel sensing immediately before a transmission. For example, Cat-2 LBT with a minimum sensing duration of 25 μs may correspond to the above-described Type 2A CAP, and Cat-2 LBT with a minimum sensing duration of 16 μs may correspond to the above-described Type 2B CAP. The minimum sensing durations are merely exemplary, and a minimum sensing duration less than 25 μs or 16 μs (e.g., a minimum sensing duration of 9 μs) may also be available.

Category 3 (Cat-3): an LBT method with fixed contention window size (CWS)i-based backoff. A transmitting entity selects a random number N in a range of 0 to a (fixed) maximum CWS value and decrements a counter value each time it determines that a channel is idle. When the counter value reaches 0, the transmitting entity is allowed to perform a transmission.

Category 4 (Cat-4): an LBT method with variable CWS-based backoff. A transmitting entity selects a random number N in a range of 0 to a (variable) maximum CWS value and decrements a counter value, each time it determines that a channel is idle. When the counter value reaches 0, the transmitting entity is allowed to perform a transmission. If the transmitting entity receives a feedback indicating reception failure of the transmission, the transmitting entity increases the maximum CWS value by one level, selects a random number again within the increased CWS value, and performs an LBT procedure. Cat-4 LBT may correspond to the above-described Type 1 CAP.

The following description is given with the appreciation that the term band may be interchangeably used with CC/cell, and a CC/cell (index) may be replaced with a BWP (index) configured within the CC/cell, or a combination of the CC/cell (index) and the BWP (index).

Terms are defined as follows.

UCI: control information transmitted on UL by the UE. UCI includes various types of control information (i.e., UCI types). For example, the UCI may include an HARQ-ACK (simply, A/N or AN), an SR, and CSI.

PUCCH: a physical layer UL channel for UCI transmission. For convenience, PUCCH resources configured and/or indicated for A/N, SR, and CSI transmission are referred to as A/N PUCCH resources, SR PUCCH resources, and CSI PUCCH resources, respectively.

UL grant DCI: DCI for a UL grant. For example, UL grant DCI means DCI formats 0_0 and 0_1, and is transmitted on a PDCCH.

DL assignment/grant DCI: DCI for a DL grant. For example, DL assignment/grant DCI means DCI formats 1_0 and 1_1, and is transmitted on a PDCCH.

PUSCH: a physical layer UL channel for UL data transmission.

Slot: a basic time unit (TU) (or time interval) for data scheduling. A slot includes a plurality of symbols. Herein, a symbol includes an OFDM symbol (e.g., CP-OFDM symbol or DFT-s-OFDM symbol). In this specification, the terms symbol, OFDM-based symbol, OFDM symbol, CP-OFDM symbol, and DFT-s-OFDM symbol may be replaced with each other.

Performing LBT for channel X/with respect to channel X: This means that performing LBT in order to confirm whether to transmit channel X. For example, a CAP may be performed before transmission of channel X is started.

In LTE enhanced LAA (eLAA), two types of CAPs for UL data transmission have been broadly defined. CAP Type 1 (hereinafter, Cat-4 LBT) is a backoff-based mechanism similar to a CAP used for DL data transmission, whereas CAP type 2 (hereinafter, 25 μs Cat-2 LBT) is a mechanism of starting UL transmission by regarding a channel to be idle when energy measured through short CCA of a minimum of 25 μs or more immediately before UL transmission is lower than a threshold. According to a description of ETSI EN 301 893, the UE (or a responding device) may perform UL transmission without CCA if the UE performs UL transmission before 16 μs after receiving a UL grant from the BS (or an initiating device). The present disclosure refers to a procedure of performing UL transmission without LBT because a gap between DL transmission and UL transmission is less than 16 μs as Cat-1 LBT, and a procedure of starting UL transmission by regarding a channel to be idle if energy measured through short CCA of 16 μs immediately before transmission is lower than a threshold as 16 μs Cat-2 LBT.

Transmission of UL data such as a PUSCH is indicated through DCI (i.e., a UL grant) transmitted through a PDCCH|. The DCI includes information about an LBT type and a PUSCH starting position which will be used by the UE during a CAP. Specifically, in legacy LTE eLAA, whether a CAP type to be used for the CAP is Type 1 (Cat-4 LBT) or type 2 (25 μs Cat-2 LBT) is indicated through a 1-bit field in the UL grant DCI, and one of 4 PUSCH starting positions {symbol #0, symbol #0+25 μs, symbol #0+25 μs+timing advance (TA), symbol #1} is indicated through another 2-bit field.

In NR, the BS may indicate, to the UE, a time domain resource of a PUSCH, i.e., the position of a starting symbol of the PUSCH and the number of symbols constituting the PUSCH, through a start and length indicator value (SLIV) in the UL grant. In other words, all symbols constituting a slot are not always used for PUSCH transmission, and the PUSCH corresponding to a length from the starting symbol indicated through the SLIV is transmitted. Therefore, the PUSCH starting position has conventionally been present between symbol #0 and symbol #1, whereas in NR, the PUSCH starting position may be present between symbol #K and symbol #(K−N) according to an SCS and a gap between transmissions, based on a starting symbol symbol #K indicated through the SLIV.

When a symbol indicated through the SLIV is symbol #K, candidates of an available PUSCH starting position may be defined as {symbol #(K−N)+16 μs, symbol #(K−N)+16 μs+TA, symbol #(K−N)+25 μs, symbol #(K−N)+25 μs+TA, symbol #K}, and {symbol #(K−N)+16 μs+TA} may be replaced with {symbol #(K−1)+max(16 μs, TA)}. If there is TA in the first symbol of the next slot after DL transmission is performed up to a symbol immediately before a PUSCH transmission starting symbol (e.g., when UL transmission starts immediately after (16 μs−TA) after DL reception), {symbol #(K−1)+16 μs+TA} may be excluded from the candidates of the PUSCH starting position. N may be predefined as a specific value (e.g., N=1) or may be separately configured/indicated through RRC signaling (or DCI or a combination of RRC and DCI). Alternatively, the N value may be (scalably) configured by the BS for the UE as a different value according to numerology. For example, N=1 for 15 kHz and N=2 for 30 kHz, according to an SCS.

For BS-initiated (or gNB-initiated) channel occupancy, a reference duration for CWS adjustment may be defined as follows. For channel occupancy with unicast PDSCH and a set of LBT bandwidths in which a single contention window is maintained, the reference duration for CWS adjustment may be the first generated duration among a duration from the start of channel occupancy to the end of the first slot in which at least one unicast PDSCH is transmitted through all resources allocated to a PDSCH and a duration from the start of channel occupancy to the end of the first transmission burst including unicast PDSCH(s) transmitted by the BS through all resources allocated to the PDSCH.

If there is channel occupancy with the unicast PDSCH but the unicast PDSCH is not transmitted through all resources allocated to the PDSCH, a duration of the first transmission burst by the BS in channel occupation including the unicast PDSCH may be the reference duration for CWS adjustment.

For UE-initiated channel occupancy, the reference duration for CWS adjustment may be defined as follows. For channel occupancy with a PUSCH and a set of LBT bandwidths in which a single contention window is maintained, the reference duration for CWS adjustment may be the first generated duration among a duration from the start of channel occupancy to the end of the first slot in which at least one PUSCH is transmitted through all resources allocated to the PUSCH and a duration from the start of channel occupancy to the end of the first transmission burst including PUSCH(s) transmitted by the UE through all resources allocated to the PUSCH. If there is channel occupation with the PUSCH but the PUSCH is not transmitted through all resources allocated to the PUSCH, the duration of the first transmission burst by the UE in channel occupation including PUSCH(s) may be the reference duration for CWS adjustment.

Prior to a description of proposed methods, frame-based equipment (FBE) and load-based equipment (LBE) in this disclosure will be briefly described. The FBE refers to a device that transmits and receives signals based on a periodic time such as a frame fixed period (FFP), and the LBE refers a device that transmits and receives signals upon intending to transmit/receive signals regardless of a period. An FBE mode and an LBE mode may be types of channel access modes. A wireless communication system of an unlicensed band to which the present disclosure is applied may support both the FBE mode and the LBE mode as the channel access mode. When the BS or the UE operates in the FBE mode, the BS and the UE may transmit signals in the next FFP by performing a CAP in an idle period within the FFP. In contrast, when the BS or the UE operates in the LBE mode, the BS and the UE may transmit signals by performing the CAP upon intending to transmit signals regardless of a specific period. In the LBE mode, both a random backoff-based CAP (e.g., Type 1 CAP or Cat-4 LBT) and non-random backoff CAP may be performed. In the FBE mode, the random backoff-based CAP is not performed.

In addition, CP insertion is used in OFDM transmission. CP insertion means that the last part of an OFDM symbol is copied and inserted into the beginning of the OFDM symbol. Transmission after filling a CP in front of a specific OFDM symbol by adjusting a CP length may be referred to as CP extension (CPE), and CPE of an appropriate length is required according to an LBT type and an SCS.

[Proposed Method #1] Method of transmitting UL data by receiving, from the BS, a PUSCH transmission starting symbol, symbol #K, indicated through an SLIV in a UL grant and receiving an LBT type of a PUSCH and a PUSCH starting position indicated as follows (1-1) Method of Receiving One of States Combined by 4 LBT Types and 5 PUSCH Starting Positions, Indicated Through a Specific 4-Bit Field in the UL Grant Table 9 below shows an LBT type and a PUSCH starting position configured by joint encoding.

TABLE 9

| State | LBT type | PUSCH starting position |
|---|---|---|
| 0 | Cat-1 LBT | Symbol # (K-N) + 16 μs |
| 1 | Cat-1 LBT | Symbol # (K-N) + 16 μs + TA |
| 2 | Cat-1 LBT | Symbol # (K) |
| 3 | 16 μs Cat-2 LBT | Symbol # (K-N) + 16 μs |
| 4 | 16 μs Cat-2 LBT | Symbol # (K-N) + 16 μs + TA |
| 5 | 16 μs Cat-2 LBT | Symbol # (K) |
| 6 | 25 μs Cat-2 LBT | Symbol # (K-N) + 25 μs |
| 7 | 25 μs Cat-2 LBT | Symbol # (K-N) + 25 μs + TA |
| 8 | 25 μs Cat-2 LBT | Symbol # (K) |
| 9 | Cat-4 LBT | Symbol # (K-N) + 16 μs |
| 10 | Cat-4 LBT | Symbol # (K-N) + 16 μs + TA |
| 11 | Cat-4 LBT | Symbol # (K-N) + 25 μs |
| 12 | Cat-4 LBT | Symbol # (K-N) + 25 μs + TA |
| 13 | Cat-4 LBT | Symbol # (K) |
| 14 | Reserved | |
| 15 | Reserved | |

In Table 9, one or both of states in which the LBT type is Cat-1 LBT or 16 μs Cat-2 LBT and the PUSCH starting position is symbol #(K), i.e., one or both of state #2 and state #5, may be excluded from states requiring an indication. In addition, state #1 may also be excluded. This is because, in Cat-1 LBT, the UE may perform UL transmission without channel sensing as long as a gap between transmissions is 16 μs or less and, in 16 μs Cat-2 LBT, LBT may be performed only when an exact 16 μs gap should be guaranteed. In Table 9, N is a value that is differently predefined (in the standard) for each state or is configured/indicated by the BS. When the PUSCH starting position is indicated, only a gap for LBT (e.g., only 16 μs in the case of state #0), except for symbol #(K−N) in Table 9, may be signaled.

(1-2) Method of Distinguishing Between [Cat-1 LBT, Cat-2 LBT] and [Cat-4 LBT] Through a 1-Bit Flag in the UL Grant and Receiving One of States Combined by the LBT Types and the PUSCH Starting Positions, Indicated Through Another 3-Bit Field Table 10 below shows exemplary combinations of the LBT types and the PUSCH starting positions when [Cat-1 LBT, Cat-2 LBT] is indicated.

TABLE 10

| State | LBT type | PUSCH starting position |
|---|---|---|
| 0 | Cat-1 LBT | Symbol # (K-N) + 16 μs |
| 1 | Cat-1 LBT | Symbol # (K-N) + 16 μs + TA |
| 2 | Cat-1 LBT | Symbol # K |
| 3 | 16 μs Cat-2 LBT | Symbol # (K-N) + 16 μs |
| 4 | 16 μs Cat-2 LBT | Symbol # (K-N) + 16 μs + TA |
| 5 | 25 μs Cat-2 LBT | Symbol # (K-N) + 25 μs |
| 6 | 25 μs Cat-2 LBT | Symbol # (K-N) + 25 μs + TA |
| 7 | 25 μs Cat-2 LBT | Symbol # K |

Table 11 below shows an example of combinations of the LBT types and the PUSCH starting position when [Cat-4 LBT] is indicated.

TABLE 11

| State | LBT type | PUSCH starting position |
|---|---|---|
| 0 | Cat-4 LBT | Symbol # (K-N) + 16 μs |
| 1 | Cat-4 LBT | Symbol # (K-N) + 16 μs + TA |
| 2 | Cat-4 LBT | Symbol # (K-N) + 25 μs |
| 3 | Cat-4 LBT | Symbol # (K-N) + 25 μs + TA |
| 4 | Cat-4 LBT | Symbol # K |
| 5 | Reserved | |
| 6 | Reserved | |
| 7 | Reserved | |

In Table 10, one or both of states in which the LBT type is Cat-1 LBT or 16 μs Cat-2 LBT and the PUSCH starting position is symbol #(K), i.e., one or both of state #1 and state #2 in Table 10, may be excluded from states requiring an indication. This is because, in Cat-1 LBT, the UE may perform UL transmission without channel sensing as long as a gap between transmissions is 16 μs or less and, in 16 μs Cat-2 LBT, LBT may be performed only when an exact 16 μs gap should be guaranteed. In the tables, N is a value that is differently predefined (in the standard) for each state or is configured/indicated by the BS. When the PUSCH starting position is indicated, only a gap for LBT (e.g., only 16 μs in the case of state #0), except for symbol #(K−N) in the above table, may be signaled.

If 4 LBT types and 5 PUSCH starting positions are indicated through respective individual fields in the UL grant, a total of 5 bits is required. However, a cell configured to use only some of the 4 LBT types through a higher layer signal such as RRC signaling or through remaining minimum system information (RMSI) may need not indicate all LBT types and PUSCH starting positions. For example, a cell operating in the FBE mode needs to indicate only one of the remaining two LBT types except for Cat-4 LBT and 16 μs Cat-2 LBT to the UE. As another example, when the use of the remaining 3 LBT types except for 25 μs Cat-2 LBT among the 4 LBT types is semi-statically indicated through RRC signaling, and one of the 3 LBT types is dynamically indicated through the UL grant, if the PUSCH transmission starting symbol is indicated as symbol #K through the SLIV, {symbol #(K−N)+25 μs, symbol #(K−N)+25 μs+TA} among the PUSCH starting positions may not need to be indicated.

As in (1-1), the BS may define one state by combining one LBT type and one PUSCH starting position to configure states through the RMSI or RRC signaling or the states may be predefined in the standard. Table 9 is an example of defining the LBT type and the PUSCH starting position as one state, and the order of states constituting an actual table or the number of the states may be different from those shown in Table 9. As mentioned in the description above, all combinations may be composed as states as shown in Table 9 and may be configured and defined. Then, only some states to be actually used may be configured/indicated. That is, only some states from a set of the combinations of the total LBT types and PUSCH starting positions may be configured for/indicated to the UE as a subset according to an operating mode or specific purpose of a cell.

Another method of indicating the LBT type and PUSCH starting position is to distinguish between [Cat-1 LBT, Cat-2 LBT] and [Cat-4] (i.e., divide the LBT type into Cat-4 LBT and non-Cat-4 LBT) through a 1-bit flag in the UL grant and to indicate one state in which the LBT type and the PUSCH starting position are combined through another 3-bit field, as in (1-2). Table 10 shows an example configured by combining Cat-1 or Cat-2 LBT and a PUSCH starting position corresponding thereto when the 1-bit flag indicates [Cat-1 LBT, Cat-2 LBT]. Table 11 shows configurable PUSCH stating positions when [Cat-4 LBT] is indicated. The advantage of this method is that, when a specific cell operates in the FBE mode, the 1-bit flag and Table 11 may not be used because Cat-4 LBT need not be indicated.

Tables 10 and 11 are examples shown by defining the LBT type and the PUSCH starting position as one state, and the order of states constituting an actual table or the number of the states may be different from those shown in Tables 10 and 11. In addition, only some states from the set of the combinations of the total LBT types and PUSCH starting positions that may be indicated when the LBT type is [Cat-1, Cat-2 LBT] or [Cat-4 LBT] may be configured/indicated as a subset according to an operating mode or specific purpose of the cell.

As the legacy LTE system supports only a 15-kHz SCS, a (25 μs+TA) value has always not exceeded the length of one OFDM symbol even when a TA value is large. In addition, in a legacy unlicensed band, since the start of PUSCH transmission has been possible only at a subframe boundary, candidates of the starting symbol of PUSCH transmission haven been defined between symbol #0 and symbol #1.

In contrast, the NR system to which the present disclosure is applied supports various SCSs, and the LBT type has been added thereto. As PUSCH transmission is indicated through the SLIV, any symbol in a slot becomes a candidate symbol in which PUSCH transmission may be started.

Conventionally, a field indicating the PUSCH starting symbol and a field indicating the LBT type has been separately present in DCI. However, the proposed method of the present disclosure proposes configuring a set of candidate combinations by combining the PUSCH transmission starting position and the LBT type as one state, as shown in Table 9 to Table 11, and indicating one combination from the set of the candidate combinations so that the UE may perform PUSCH transmission based on one indicated combination.

Figure 10:
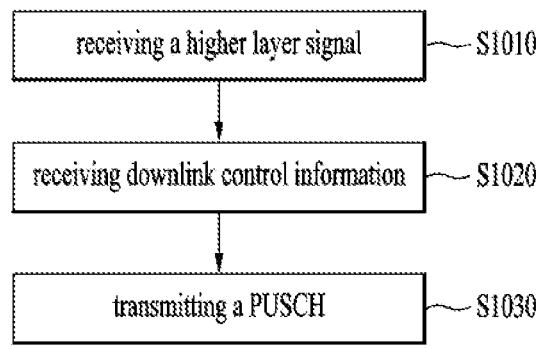
FIGS. 10 and 11 illustrate signal transmission procedures according to an embodiment of the present disclosure.
Figure 11:
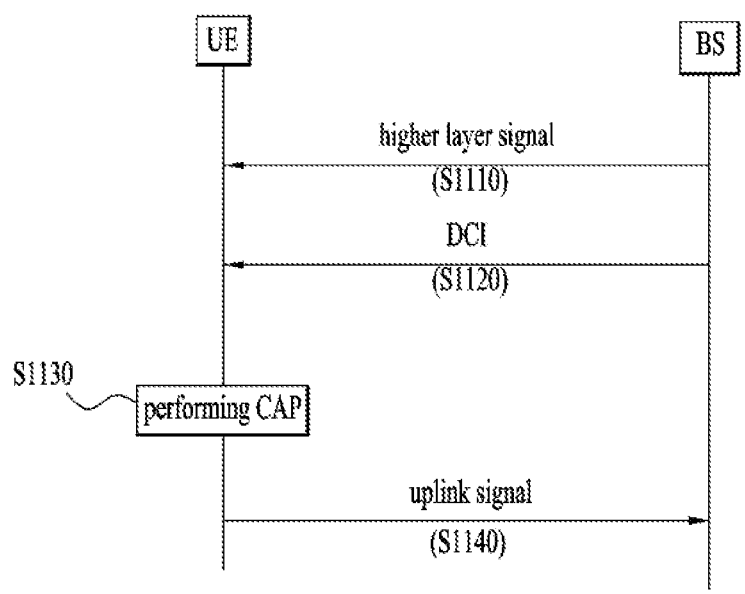

Specifically, referring to FIGS. 10 and 11, the UE may receive a plurality of combinations of information related to a PUSCH starting position and a CAP type (S1010 and S1110). The plural combinations may be part of candidate combinations of the information related to the PUSCH starting position and the CAP type. As an example, 4 CAP types may be present, and m PUSCH starting positions may be present in consideration of the length of a minimum sensing duration according to the TA and CAP type (where m is a natural number greater than 1). Therefore, a maximum of 4m candidate combinations may be derived by combining the 4 CAP types and the m PUSCH starting positions. The 4m candidate combinations may be preconfigured, and the UE may receive some of total candidate combinations through a higher layer signal. Thereafter, the UE may receive DCI including one of the plural combinations, which are some of the total candidate combinations, (S1020 and S1120). The UE may perform a CAP according to a CAP type indicated through the one received combination (S1130) and start PUSCH transmission at a PUSCH starting position indicated through the information related to a PUSCH starting position indicated through the one combination (S1030 and S1140).

[Proposed Method #2] Method of configuring a field indicating an LBT type and a PUSCH starting position (or a state of combining the two) in a UL grant (or DL assignment), when the BS configures, for the UE, information about an LBT type or a channel access mode (e.g., FBE mode or LBE mode) to be used in a corresponding cell through a higher layer signal such as RRC or the BS informs the UE of the information through a physical layer signal such as DCI or through a combination of the higher layer signal and the physical layer signal Four LBT types that the BS may indicate to the UE are {Cat-1 LBT, 16 μs Cat-2 LBT, 25 μs Cat-2 LBT, Cat-4 LBT}. However, according to the capability of the UE or the operation mode of the cell, the UE may be indicated to use only some of the 4 LBT types. Two bits are needed to indicate a total of 4 LBT types. However, when only some LBT types are configured/indicated to be used, since only one of the configured/indicated LBT types needs to be indicated, the number of bits needed to indicate an LBT type in the UL grant (or DL allocation for PUCCH transmission) may be less than two bits. For example, if the UE reports on non-support of Cat-1 LBT and 16 μs Cat-2 LBT, the BS only needs to indicate one of 25 μs Cat-2 LBT and Cat-4 LBT through one bit. If the UE is informed through a higher layer signal (e.g., SIB) that the cell is operating in the FBE mode, the UE may expect that one of the remaining 3 LBT types except for Cat-4 LBT among the 4 LBT types will be indicated. Alternatively, the BS may inform the UE in advance of an LBT type to be used through a higher layer signal, a physical layer signal, or a combination thereof and may indicate one of the 3 LBT types.

If the LBT type to be indicated to the UE is configured/indicated in advance as described above, a PUSCH starting position candidate set indicated together with the LBT type may also vary accordingly. When the PUSCH starting position, symbol #K, is indicated to the UE through the SLIV, the candidate sets of PUSCH starting positions that may be indicated are four in total, i.e., {symbol #(K−C1)+25 μs, symbol #(K−C2)+16 μs+TA, symbol #(K−C3)+25 μs+TA, symbol #K}. However, since the PUSCH starting position corresponds to each LBT type, a PUSCH starting position subset may be determined according to the LBT type configured for/indicated to the corresponding cell. Here, C1, C2, and C3 values may be different according to an SCS and a PUSCH starting position candidate, and a gap from a corresponding starting position to symbol #K may be filled through CPE of the first symbol of the PUSCH. For example, if the LBT type configured for/indicated to the cell is only 16 μs Cat-2 LBT, the PUSCH starting position subset may be determined as {symbol #(K−C2)+16 s+TA, symbol #K}.

In order to indicate all LBT types and all PUSCH starting positions to the UE, 2 bits are each required, so a total of 4 bits is required for the UL grant (or DL allocation). However, when a channel access mode, or an LBT type to be used in the cell is configured/indicated in advance, the number of LBT types and PUSCH starting positions to be indicated may be reduced. Therefore, (i) the number of bits needed when the LBT type and the PUSCH starting position are indicated through a combination thereof as one state as in (1-1) of Proposed Method #1 may be determined as ceiling [log 2(total number of states that may be indicated)]. Alternatively, (ii) when the LBT type and the PUSCH starting position are indicated through individual fields, the number of bits of the field for distinguishing between LBT types may be determined as ceiling[log 2(the number of configured/indicated LBT types)], and the number of bits needed to indicate the PUSCH starting position may be determined as ceiling[log 2(a maximum value among the number of PUSCH starting position states that may be indicated to correspond to the configured/indicated LBT type)]. Here, the maximum value among the number of PUSCH starting position states that may be indicated to correspond to the configured/indicated LBT type is applied as follows. For example, when two LBT types, i.e., 16 μs Cat-2 LBT and Cat-4 LBT, are configured/indicated for the cell, since the number of PUSCH starting position candidates for 16 μs Cat-2 LBT is 2 as {symbol #(K−C2)+16 μs TA, symbol #K}, and the number of PUSCH starting position candidates for Cat-4 LBT is 4 as {symbol #(K−C1)+25 μs, symbol #(K−C2)+16 μs+TA, symbol #(K−C3)+25 μs+TA, symbol #K}, the number of bits of the field required to indicate the PUSCH starting position is log 2(4). The method of (ii) is applicable even when the LBT types are distinguished through a flag as in (1-2) of Proposed Method #1 and the PUSCH starting position table is changed accordingly.

[Proposed Method #3] Method of transmitting a PUSCH as follows in consideration of the length of a gap corresponding to an indicated PUSCH starting position from symbol #(K−N) regardless of a TA, when a PUSCH transmission starting symbol symbol #K, an LBT type, and the PUSCH starting position are indicated through the SLIV in the UL grant received from the BS In this case, N may be a value previously configured/indicated for each SCS through each RMSI/RRC/DCI or a combination thereof, irrespective of the TA value, or may be a value defined in the standard.

(3-1) Method of Transmitting the PUSCH by Filling a Gap Between the Indicated PUSCH Starting Position and Symbol #K Indicated Through the SLIV with a CP of Symbol #K, Based on the Previously Configured/Indicated/Defined N Value for Each SCS, when the UE Succeeds in LBT According to the Indicated Type However, when there is no gap between the PUSCH starting position and symbol #K, the UE may immediately transmit the PUSCH without CPE.

(3-2) Method of Regarding Related Scheduling to be Invalid and Discarding DCI (UL Grant) Thereof or Processing Related Scheduling as an Error Case, when a Value Obtained by Adding the Gap Corresponding to the Indicated PUSCH Starting Position to Symbol #(K−N) Exceeds Symbol #K, which is the PUSCH Transmission Starting Symbol Indicated Through the SLIV In LTE eLAA, one of 4 PUSCH starting positions {symbol #0, symbol #0+25 μs, symbol #0+25 μs+TA, symbol #1} may be indicated through 2 bits in the UL grant. Thereamong, the PUSCH starting positions present between symbol #0 and symbol #1, e.g., symbol #0+25 μs, may be indicated when transmission of a previous subframe is UL, and symbol #0+25 μs+TA may be indicated when transmission of the previous subframe is DL. Upon succeeding in LBT, the UE transmits the PUSCH by filling the gap between the indicated PUSCH starting position and symbol #1 through CPE of symbol #1. The reason is that, when the PUSCH starting position present between symbol #0 and symbol #1 is indicated to the UE and the UE succeeds in LBT so that the UE attempts to start transmission from symbol #1, another node (e.g., Wi-Fi) may determine that there is no transmission in a gap between {symbol #0+25 μs} and {symbol #1} or a gap between {symbol #0+25 μs+TA} and {symbol #1} and occupy a channel in the gap.

Similarly, in NR-unlicensed (NR-U), when one of the PUSCH starting positions present between symbol #K indicated through the SLIV and symbol #(K−N) defined by the previously configured/indicated/defined N value for each SCS is indicated, that is, when one of {symbol #(K−N)+16 μs, symbol #(K−N)+16 μs+TA, symbol #(K−N)+25 μs, symbol #(K−N)+25 μs+TA} is indicated, the UE may transmit the PUSCH by filling a gap between symbol #K and the indicated PUSCH starting position through CPE.

Figure 12:
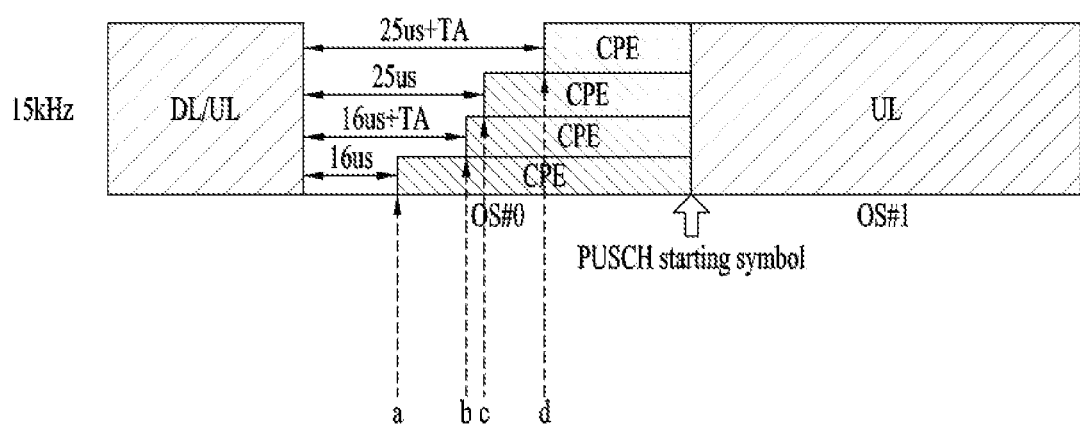
FIGS. 12 to 17 illustrate exemplary uplink signal transmission according to an embodiment of the present disclosure.

FIG. 12 illustrates the length of CPE when a PUSCH starting position for a 15-kHz SCS is indicated. Referring to FIG. 10, if a PUSCH transmission starting symbol indicated through the SLIV is OS #1 and PUSCH starting positions a, b, c, or d are indicated in a symbol (i.e., OS #0) duration prior to symbol OS #1 after the UE performs DL reception or UL transmission (i.e., the PUSCH starting positions are indicated between symbol #0 and symbol #1 if the PUSCH starting symbol indicated through the SLIV is symbol #0), the UE may transmit the PUSCH by filling a gap between the PUSCH starting position and OS #1 through CPE.

As an example, when the N value is configured/indicated/defined as 1 regardless of a TA value, since the length of one OFDM symbol for the 15-kHz SCS is approximately 70 μs, the case in which the length of a gap corresponding to each PUSCH starting position exceeds symbol #K may not occur in consideration of a typical TA value even when symbol #(K−N) is added to one of {16 μs, 16 μs+TA, 25 μs, 25 μs+TA}.

However, if the TA value is very large so that the value of ({25 μs+TA}+gap) from symbol #(K−N) exceeds symbol #K, the UE may determine that related scheduling is not valid as in (3-2) and disregard corresponding DCI (UL grant) or process related scheduling as an error case.

In the case of a 30-kHz SCS, the length of one OFDM symbol length is about 33 μs and, in the case of a 60-kHz SCS, the length of one OFDM symbol is about 16 μs. Therefore, the case in which the length of the gap corresponding to each PUSCH starting position exceeds symbol #K according to the configured/indicated/defined N value when symbol #(K−N) is added to one of {16 μs, 16 μs+TA, 25 μs, 25 μs+TA} may occur.

The N value of each state may be determined based on a gap corresponding to a specific PUSCH starting position regardless of a TA. For example, the N value defined in the standard may be predefined for each PUSCH starting position of each SCS as follows.

15 kHz: {symbol #(K−1)+16 μs, symbol #(K−1)+16 μs+TA, symbol #(K−1)+25 μs, symbol #(K−1)+25 μs+TA, symbol #K}

30 kHz: {symbol #(K−1)+16 μs, symbol #(K−1)+16 μs+TA, symbol #(K−1)+25 symbol #(K−2)+25 μs+TA, symbol #K}

60 kHz: {symbol #(K−2)+16 μs, symbol #(K−2)+16 μs+TA, symbol #(K−3)+25 μs, symbol #(K−3)+25 μs+TA, symbol #K}

If a specific PUSCH starting position defined based on the N value determined in the standard exceeds symbol #K due to an actual TA value, the UE may consider that related scheduling is invalid and discard the DCI (UL grant) or process related scheduling as an error case.

Figure 13:
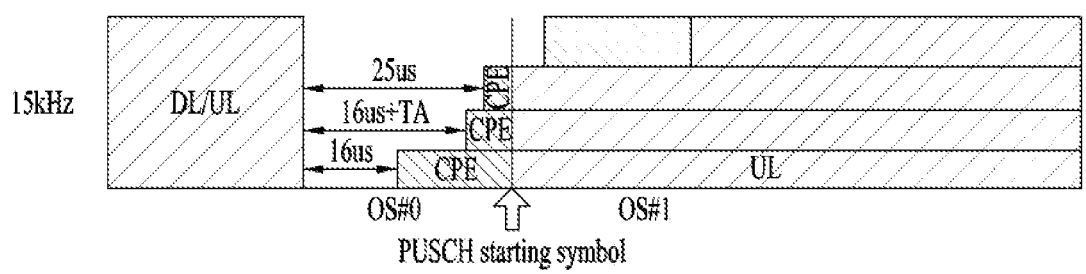

FIG. 13 illustrates the length of CPE when each PUSCH starting position for a 30-kHz SCS is indicated.

Referring to FIG. 13, if a PUSCH starting symbol for the 30-kHz SCS indicated through the SLIV is OS #1 and a PUSCH starting position is indicated in a symbol (i.e., OS #0) duration prior to symbol OS #1 after the UE performs DL reception or UL transmission (i.e., the PUSCH starting position is indicated between symbol #0 and symbol #1 when the PUSCH starting symbol indicated through the SLIV is symbol #0), the UE may transmit the PUSCH by filling a gap between the PUSCH starting position and OS #1 through CPE.

As an example, when the N value is configured/indicated/defined as 1 regardless of the TA value, since the length of one OFDM symbol for the 30-kHz SCS is approximately 33 μs, the case in which the length of a gap corresponding to each PUSCH starting position exceeds symbol #1 may occur according to the TA value. For example, the length of the gap corresponding to the PUSCH starting position is indicated as {25 μs+TA} among {16 μs, 16 μs+TA, 25 μs, 25 μs+TA}, the case in which the length of the gap exceeds symbol #1 may occur according to the TA value. In this case, the UE may determine that related scheduling is not valid as in (3-2) and disregard corresponding DCI (UL grant) or process related scheduling as an error case.

[Proposed Method #4] Method of calculating an N value, which is a reference of the PUSCH starting position, according to the TA value and transmitting the PUSCH, when the PUSCH transmission starting symbol symbol #K, the LBT type, and the PUSCH starting position are indicated through the SLIV in the UL grant by the BS The N value may be configured not to exceed symbol #K when a gap corresponding to an indicated PUSCH starting position is added to symbol #(K−N), or N may be configured not to exceed the length of one OFDM symbol based on a corresponding SCS when the UE transmits the PUSCH by filling a duration from the PUSCH starting position to symbol #K through CPE.

The UE may calculate the N value for each SCS and transmit the PUSCH by filling a gap between the indicated PUSCH starting position and symbol #K indicated through the SLIV with a CP of symbol #K (i.e. CPE).

However, if there is no gap between the PUSCH starting position and symbol #K, the PUSCH may be immediately transmitted without CPE.

If one of PUSCH starting positions present between symbol #K indicated through the SLIV and symbol #(K−N) according to the N value calculated based on the TA value for each SCS is indicated to the UE, the UE may transmit the PUSCH by filling a gap between symbol #K and the indicated PUSCH starting position with the CP of symbol #K. Since the length of CPE may vary according to the N value, the BS may calculate and configure the N value such that the length of CPE for each SCS does not exceed the length of one OFDM symbol. In addition, the BS may configure the N value such that a specific PUSCH starting position does not exceed symbol #K indicated through SLIV according to the TA value.

For example, in FIG. 13, if the UE configures the N value so as not to exceed the PUSCH starting symbol indicated through the SLIV in consideration of the TA value, the N value may be set to 2.

[Proposed Method #5] Although the BS has indicated CPE in consideration of the LBT type (or CAP type) and the TA value of the UE upon scheduling the PUSCH through the UL grant for the UE, if a CPE duration calculated by the UE becomes different from a value intended originally by the BS due to an inaccurate TA value so that a gap between transmissions does not match the LBT type indicated to the UE, the UE may operate as follows.

(5-1) Method of performing 25 μs Cat-2 LBT before 25 μs from a UL starting time actually calculated by the UE and transmitting the PUSCH, when an originally indicated LBT type is 25 μs Cat-2 LBT and a gap between actual transmissions is greater than 25 μs (5-2) Method of performing 16 μs Cat-2 LBT before 16 μs from the UL starting time actually calculated by the UE and transmitting the PUSCH, when the originally indicated LBT type is 16 μs Cat-2 LBT and the gap between actual transmissions is greater than 16 μs (5-3) Method of performing 25 μs Cat-2 LBT before 25 μs from the UL starting time actually calculated by the UE and transmitting the PUSCH, when the originally indicated LBT type is 16 μs Cat-2 LBT and the gap between actual transmissions is greater than 25 μs (5-4) Method of performing 16 μs Cat-2 LBT before 16 μs from the UL starting time actually calculated by the UE and transmitting the PUSCH when an originally indicated LBT type is 16 μs Cat-1 LBT and the gap between actual transmissions is greater than 16 μs (5-5) Method of performing 25 μs Cat-2 LBT before 25 μs from the UL starting time actually calculated by the UE and transmitting the PUSCH, when the originally indicated LBT type is 16 μs Cat-1 LBT and the gap between actual transmissions is greater than 25 μs (5-6) Method of skipping transmission of the PUSCH, when the originally indicated LBT type is 16 μs Cat-1 LBT and the gap between actual transmissions is greater than 16 μs (5-7) Method of transmitting the PUSCH in Cat-1 LBT by allowing CPE longer than the length of one OFDM symbol, when the originally indicated LBT type is 16 μs Cat-1 LBT and the gap between actual transmissions is greater than 16 μs The BS may indicate CPE and the LBT type considering the TA value of the UE through the UL grant during UL scheduling by tracking the TA value of the UE after RRC connection with the UE. However, when a TA value managed by the BS and an actual TA value of the UE are different from each other, the length of CPE calculated based on the indication of the BS may be less than 0 or longer than the length of one OFDM symbol. If the length of CPE is maintained at a value which is always greater than 0 and less than the length of one OFDM symbol, the gap between transmissions considered by the BS during UL scheduling and the LBT type corresponding thereto may not match an actual length of the gap.

That is, the TA value of the BS and the actual TA value of the UE may be different, so that a gap before UL scheduling may be longer than the length of a gap originally intended by the BS. For example, although the BS indicates 25 μs Cat-2 LBT under the assumption that a gap between immediately preceding transmission and UL transmission to be scheduled is 25 μs by indicating CPE considering a TA value and an LBT gap, the length of a CP required for a 25 μs gap may be greater than the length of one symbol when the length of the CP is calculated using the actual TA value of the UE. In this situation, if the length of the CP is restricted not to be greater than the length of one symbol, the gap between immediately preceding transmission and UL transmission scheduled by the UE may be greater than 25 μs. Therefore, since the indicated LBT type, the actual length of the gap, and the recalculated actual UL transmission starting time are changed, the UE may operate as in the methods of (5-1) to (5-7).

More specifically, referring to a CPE calculation part of Section 5.3.1 of TS 38.211, the UE calculates Text using an equation of Table 5.3.1-1 based on information indicated through the UL grant and applies a final CPE value calculated by an equation of $\min(\max(T_{ext},0),T_{symb,(l-1)mod\ 7\text{-}2^{\mu}})$. As described above, if the required Text value calculated by the UE based on the actual TA value is greater than the length of one OFDM symbol but the length of the CP of a maximum of the length of one OFDM symbol shorter than the actual required length according to the above equation is applied, the length of the gap between immediately previous transmission and scheduled UL transmission may be longer than a length intended by the BS. Therefore, in this case, the gap between the indicated LBT type and actual transmission may be different, and the UE may transmit the PUSCH by applying the methods of (5-1) to (5-7).

In the case of the method of (7), since 16 μs Cat-1 LBT may be applied only when the length of the gap between transmissions is exactly 16 μs, the length of the CP longer than the length of one OFDM symbol is permitted as an exceptional case in order to allow the UE to transmit the PUSCH even when the gap between transmissions is larger than 16 μs due to restrictions on the length of the CP.

Proposed Method #5 may be applied to other UL signals/channels that require CPE, such as a PUCCH or an SRS, scheduled through DL assignment, as well as the PUSCH scheduled through the UL grant.

[Proposed Method #6] When an indicated LBT type and a gap, based on a TA value of the UE that the BS tracks, do not match an actual TA value of the UE so that CPE that exceeds the length of one symbol is needed, the UE may operate as follows.

(6-1) If an LBT type indicated by the BS or performed by the UE is Cat-4 LBT, CPE of a length calculated by the CPE calculation equation defined in Section 5.3.1 of TS 38.211 may be applied, and corresponding UL transmission may be dropped in the case of Cat-1 LBT or 16 μs or 25 μs Cat-2 LBT.

(6-2) If the LBT type indicated by the BS or performed by the UE is Cat-1 LBT or 16 μs or 25 μs Cat-2 LBT, the UE may indicate, to the BS, the fact that an actual gap is larger than a gap intended by the BS through a previously defined or configured/indicated DM-RS sequence or through UCI piggyback.

During UL scheduling, the BS indicates, to the UE, CPE and an LBT type necessary for the UE in consideration of a gap with previous transmission based on a TA value of the UE that the BS tracks. However, since an actual TA value of the UE may be different from a TA value of the BS, a gap between actual transmissions may be larger than a gap intended by the BS. In this case, CPE greater than one symbol may be required.

Since the length of CPE is regulated not to exceed a maximum of the length of one OFDM symbol, if the LBT type indicated by the BS or performed by the UE is Cat-4 LBT, the UE may calculate Text by the equation of Table 5.3.1-1 based on information indicated through the UL grant and applies a final CPE value calculated by the equation $\min(\max(T_{ext},0),T_{symb,(l-1)mod\ 7\text{-}2^{\mu}})$. If the LBT type indicated by the BS or performed by the UE is Cat-1 LBT, 16 μs Cat-2, or 25 μs Cat-2 LBT, since UL transmission is allowed only when the gap is exactly 16 μs or 25 μs, the UE may drop corresponding UL transmission in the case of $\max(T_{ext},0),T_{symb,(l-1)mod\ 7\text{-}2^{\mu}})$.

When the UE performs subsequent UL transmission after performing Cat-1 LBT, 16 μs Cat-2, or 25 μs Cat-2 LBT by sharing a COT obtained by the BS through Cat-4 LBT for DL transmission, if a gap between DL transmission and UL transmission is exactly 16 μs or 25 μs and the COT remains after UL transmission (e.g., DL length+UL length<COT length), multiple DL/UL switching in which the BS may perform DL transmission again after UL transmission may be performed. If the gap between DL transmission and UL transmission within the COT is greater than 16 μs or 25 μs, single UL transmission may be performed when 16 μs or 25 μs Cat-2 LBT is successfully performed immediately before UL transmission, and subsequent DL transmission may not be performed even if the COT remains. Since this pause COT operation is allowed only for single DL-UL switching transmission, if the actual length of the gap is larger than a gap intended by the BS, i.e., if $\max(T_{ext},0)>T_{symb,(l-1)mod\ 7\text{-}2^{\mu}}$, the BS may be informed of the fact that multiple DL/UL switching transmission that performs DL transmission followed by UL transmission is not possible through a DM-RS sequence which is previously defined in the standard or is previously configured/indicated or through UCI piggyback. This proposal may be particularly applied when the LBT type indicated by the BS or performed by the UE is Cat-1 LBT, 16 μs Cat-2, or 25 μs Cat-2 LBT.

[Proposed Method #7] Method of configuring a reference duration T in the following methods and reflecting HARQ-ACK for the PUSCH in the reference duration T to adjust a CWS, when the UE intends to determine the reference duration T for CWS adjustment with respect to a UE-initiated COT in a carrier aggregation (CA) situation in which a plurality of cells having different SCSs is configured (7-1) Method of configuring up to a boundary of the nearest slot based on a cell in which a unicast PUSCH is transmitted through all resources allocated to a PUSCH as T (7-2) Method of configuring up to a boundary of the nearest slot among any cells configured with CA as T (7-3) Method of configuring up to a boundary of a slot nearest a cell having the smallest or largest SCS as T (7-4) Method of configuring up to a boundary of a slot nearest a specific cell configured/indicated by the BS through RRC, DCI, or a combination of RRC and DCI as T (7-5) Method of configuring up to a boundary of a slot nearest a cell having the lowest index or the highest index as T However, the reference duration T for CWS adjustment in a cell having a specific SCS may be a first occurring one among a duration from the start of the COT to the end of the first slot with at least one PUSCH transmitted through all resources allocated to the PUSCH and a duration from the start of the COT to the end of the first UL burst including PUSCH(s) transmitted by the UE through all resources allocated to the PUSCH. Although there is channel occupancy with the PUSCH, if the PUSCH is not transmitted through all resources allocated to the PUSCH, the first UL burst duration by the UE in channel occupancy including the PUSCH(s) may be the reference duration T for CWS adjustment.

When the UE receives data scheduling from a single cell, a duration from the start of a UE-initiated COT to a slot with a unicast PUSCH transmitted through all resources allocated to the PUSCH among PUSCHs constituting a UL burst may be configured as the reference duration T. However, when CA with which the UE may receive scheduling from a plurality of cells having different SCSs is configured, a slot boundary may be different according to each cell. In NR, since the UE may receive CBG-based scheduling or non-slot-based scheduling in addition to slot-based scheduling, a unicast PUSCH transmitted through all resources allocated to the PUSCH occurs in a cell having a specific SCS. Accordingly, if it is desired to configure the reference duration T, the reference duration T may not be aligned with a slot boundary of a cell having another SCS. In this case, promise/definition as in the methods of (7-1) to (7-5) above may be required to determine up to which slot for each cell should be included in the reference duration T.

Figure 14:
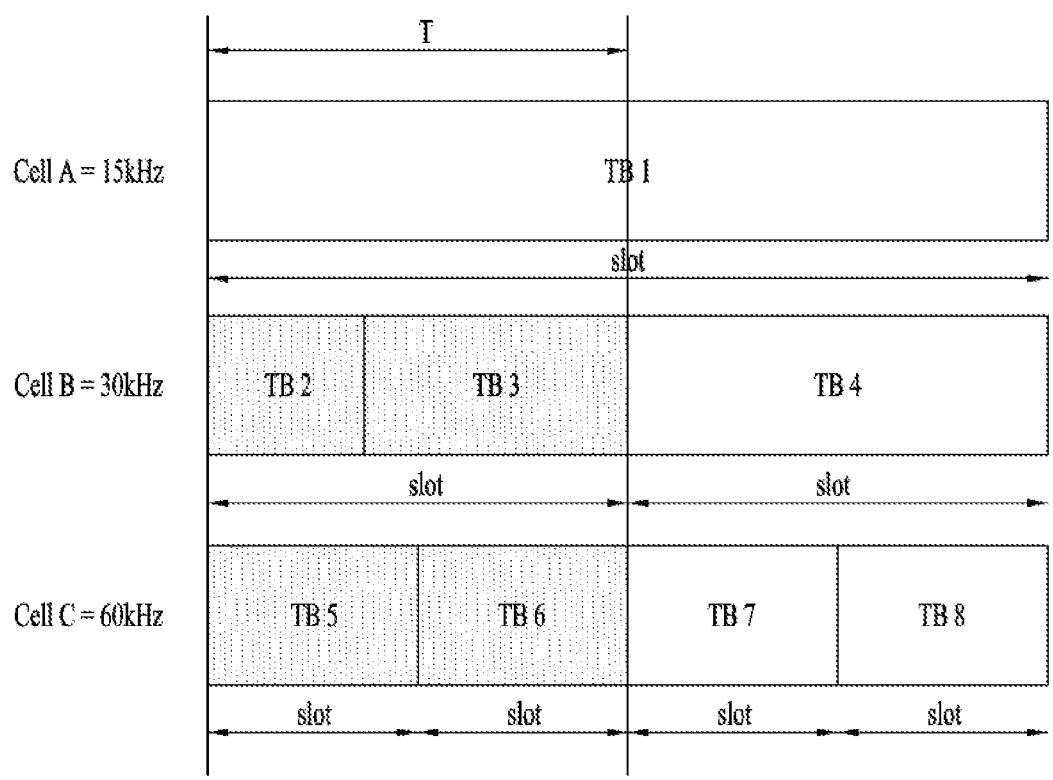

FIG. 14 illustrates a situation in which three cells having different SCSs are configured with CA and UL transmission is scheduled for the UE.

Referring to FIG. 14, cells A, B, and C having different SCSs are configured with CA and UL transmission is scheduled for the UE. A PUSCH on which TB2 transmitted in a mini-slot is transmitted through all resources allocated to the PUSCH occurs in the 30-kHz cell B, and up to a boundary of the nearest slot based on a cell transmitted through all resources allocated to the PUSCH is configured as the reference duration T as in the method of (7-1). That is, TB 2 transmitted through all resources allocated to the PUSCH occurs in the middle of the first slot of cell B so that the reference duration T including a duration to the end of the slot including TB 2 based on an SCS of 30 kHz is configured. In the case of cell C, since TB 5 and TB 6 belong to the configured reference duration T, the reference duration T may be reflected in CWS adjustment of the UE according to a decoding result for TB 2, TB 3, TB 5, and TB 6 (whether retransmission scheduling through an NDI is performed).

Figure 15:
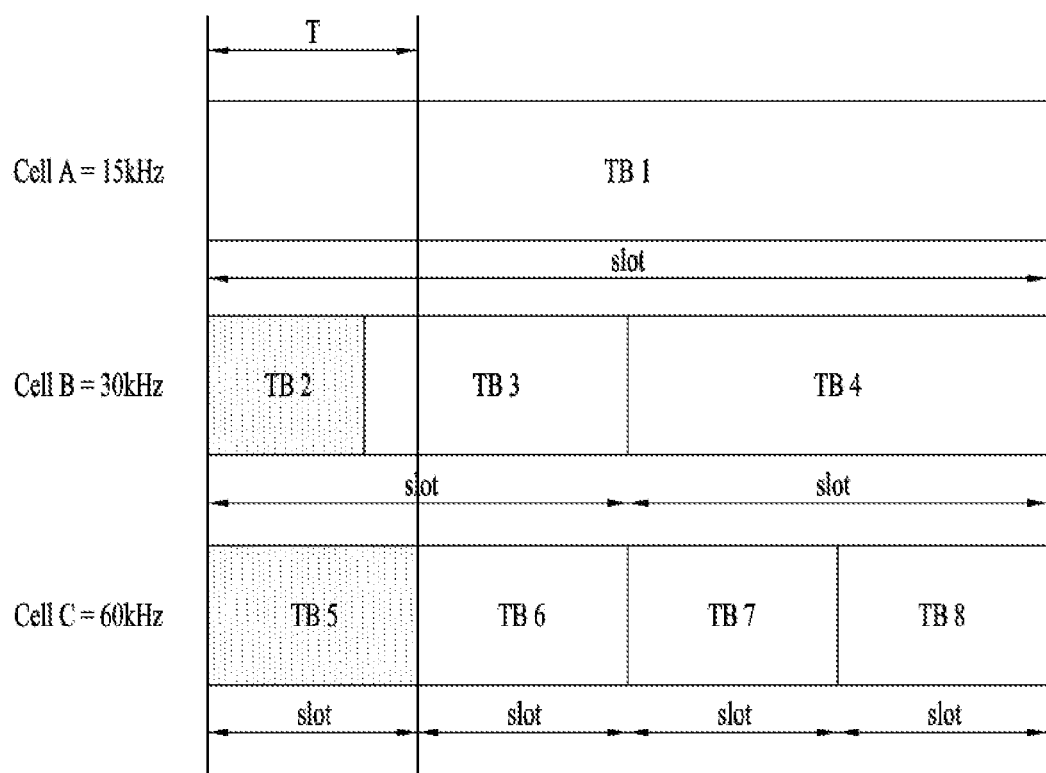

FIG. 15 illustrates another situation in which three cells having different SCSs are configured with CA and UL transmission is scheduled for the UE.

If the reference duration T is configured as in the method of (7-2) in the situation as illustrated FIG. 15, up to a slot in which TB 5 of cell C is scheduled based on TB 2 may be configured as T.

Figure 16:
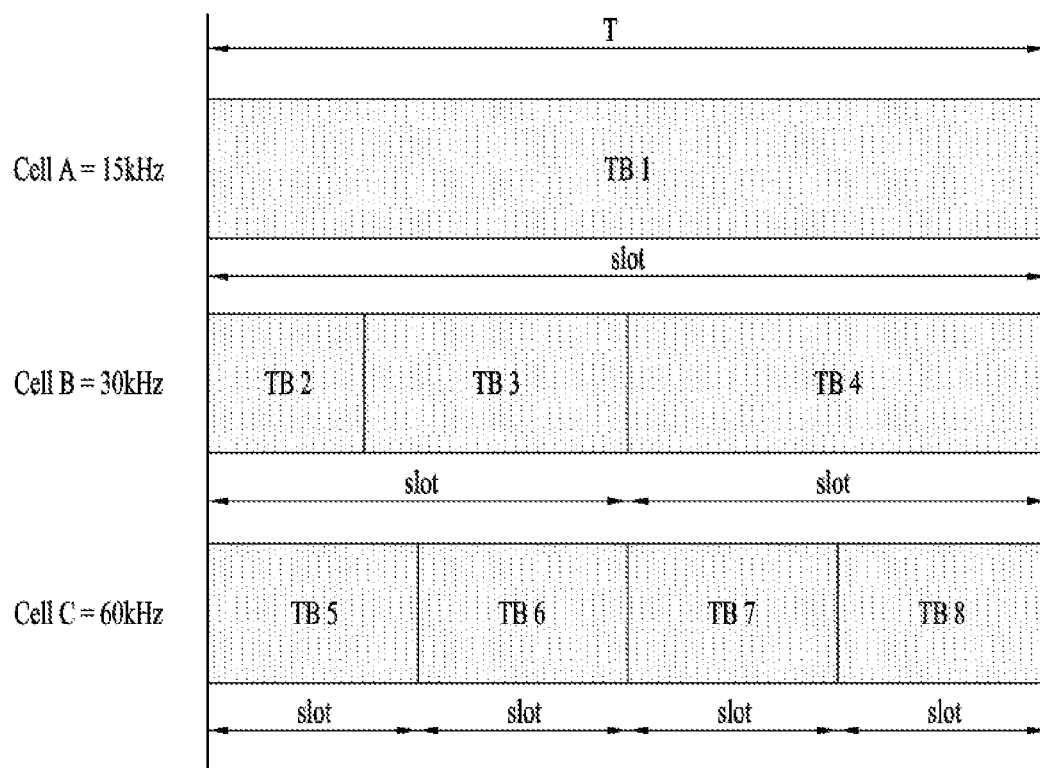

FIG. 16 illustrates another situation in which three cells having different SCSs are configured with CA and UL transmission is scheduled for the UE.

If the reference duration T is configured based on the smallest SCS in the method of (7-3), up to a slot including TB 1 of cell A is configured as the reference duration T, so that all TBs are included in the reference duration T. If the reference duration T is configured based on a large SCS, up to a slot in which TB 5 of cell C is scheduled may be configured as the reference duration T as in the method of (7-2).

The BS may previously indicate/configure, to/for the UE, whether to configure the reference duration T based on a slot boundary of any cell through RRC, DCI, or a combination of RRC and DCI as in (7-4). Alternatively, as in (7-5), the reference duration T may be configured based on a slot boundary nearest a cell having the smallest or largest cell index among a plurality of cells configured with CA.

[Proposed Method #8] When the UE receives, from the BS, a minimum duration D1 consumed until a UL grant containing feedback (e.g., an NDI or CBG transmission information (CBGTI)) for the PUSCH is received through a higher layer signal such as RRC and then the UE desires to configure the reference duration T in the latest UE-initiated COT before n−D1 for UL CWS adjustment, if there is no PUSCH transmitted through all resources allocated to the PUSCH among unicast PUSCHs transmitted from the start of a corresponding COT to n−D1 in a COT (in other words, only a PUSCH transmitted through only some of all resources allocated to the PUSCH among the unicast PUSCHs transmitted from the start of the COT to n−D1), the reference duration T may be configured as follows and be reflected in CWS adjustment.

(8-1) Method of configuring the reference period T based only on PUSCH(s) transmitted through some resources allocated to the PUSCH among PUSCH(s) transmitted in the latest UE-initiated COT before n−D1

(8-2) Method of configuring the reference duration T based on a feedback result within the reference duration T by returning back to the latest (immediately previous) UE-initiated COT transmitted earlier Here, D1 is a time from the last symbol of the PUSCH to a start symbol of the UL grant containing feedback and may be configured in units of slots or symbols. If D1 is not configured but a minimum duration D2 consumed until CG-DFI is received after CG-PUSCH transmission is configured, D2 may be used as the D1 value. Even if the D1 value is configured, the D1 value may be replaced with the D2 value according to a previous configuration/indication or previous definition in the standard, or the D1 value may be determined as a function of the D1 and D2 values, such as min(D1, D2) or max(D1, D2).

For UE-initiated channel occupancy, the reference duration for CWS adjustment may be defined as follows. For channel occupancy with the PUSCH and a set of LBT bandwidths in which a single contention window is maintained, the reference duration for CWS adjustment may be the first generated duration among a duration from the start of channel occupancy to the end of the first slot in which at least one PUSCH is transmitted through all resources allocated to the PUSCH and a duration from the start of channel occupancy to the end of the first transmission burst including PUSCH(s) transmitted by the UE through all resources allocated to the PUSCH. If there is channel occupation with the PUSCH but the PUSCH is not transmitted through all resources allocated to the PUSCH, the duration of the first transmission burst by the UE in channel occupation including PUSCH(s) may be the reference duration for CWS adjustment.

The UE may receive, from the BS, the minimum duration D1 required to receive the UL grant containing feedback for the PUSCH transmitted thereby through a higher layer signal such as RRC. Upon receiving the UL grant, the UE may configure, for CWS adjustment, the reference duration T up to a PUSCH slot transmitted through all resources allocated to the PUSCH among PUSCHs transmitted in the latest UE-initiated COT before n−D1 and adjust a CWS based on a feedback result for the PUSCH within the reference duration. However, if the PUSCH transmitted through all resources allocated to the PUSCH among the PUSCHs transmitted in the latest UE initiated COT before n−D1 does not exist at a CWS adjustment timing, the reference duration T may not be configured by definition of the reference duration.

Figure 17:
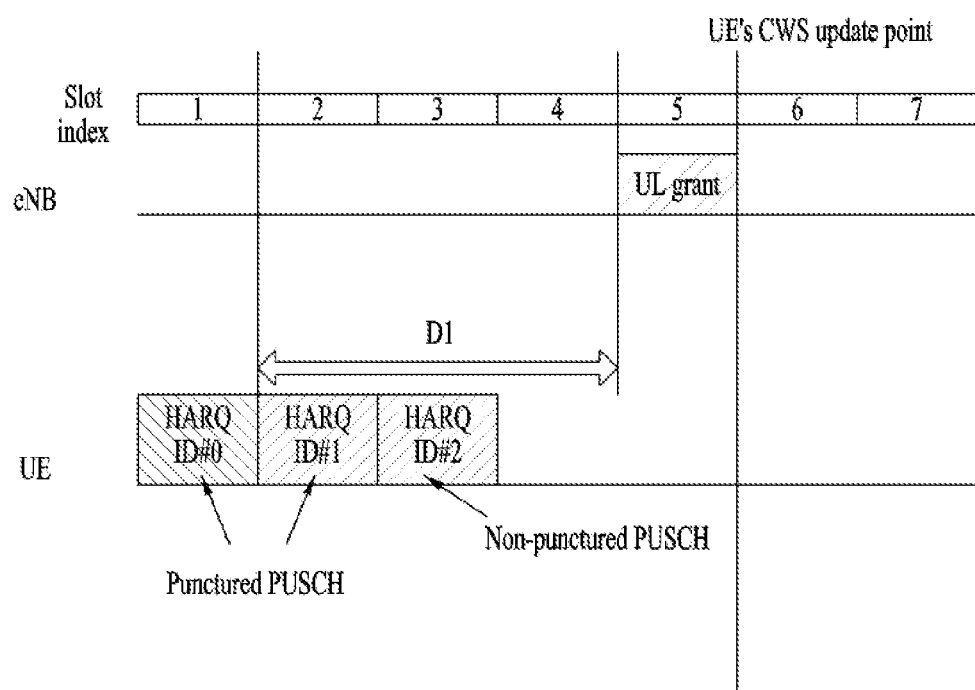

FIG. 17 exemplarily illustrates a CWS adjustment timing of the UE and PUSCHs in the latest UE-initiated COT before the configured D1.

In a situation of FIG. 17, the UE receives a UL grant in slot #5 when D1=4 (slots) is configured and, among PUSCHs transmitted within the latest UE-initiated COT before D1 in order to perform CWS adjustment, PUSCHs transmitted with HARQ ID #0 and HARQ ID #1 are not transmitted through all resources allocated to the PUSCH, and a PUSCH transmitted with HARQ ID #2 is transmitted through all resources allocated to the PUSCH. In this example, since there is no PUSCH transmitted through all resources allocated to the PUSCH in the latest UE-initiated COT before n−D1 from a time when the UE receives the UL grant, the reference duration T may not be configured according to the definition of the reference duration.

In this case, the UE may adjust the CWS by (8-1) or (8-2) of the proposed method. In the case of (8-1), although the reference duration T is not configured because there is no PUSCH transmitted through all resources allocated to the PUSCH in the latest UE-initiated COT before n−D1, PUSCH(s) transmitted through some resources are configured as the reference duration T (in the example of FIG. 11, a duration up to the PUSCH transmitted with HARQ ID #0 is configured as T). In the case of (8-2), the CWS is adjusted based on a feedback result within the reference duration T by returning back to a UL burst transmitted earlier than the latest UE-initiated COT before n−D1.

Each of the above-mentioned proposed methods may be combined and applied together with other proposed methods unless they conflict with each other.

The various descriptions, functions, procedures, proposals, methods, and/or operation flowcharts of the present disclosure described herein may be applied to, but not limited to, various fields requiring wireless communication/connectivity (e.g., 5G) between devices.

More specific examples will be described below with reference to the drawings. In the following drawings/description, like reference numerals denote the same or corresponding hardware blocks, software blocks, or function blocks, unless otherwise specified.

Figure 18:
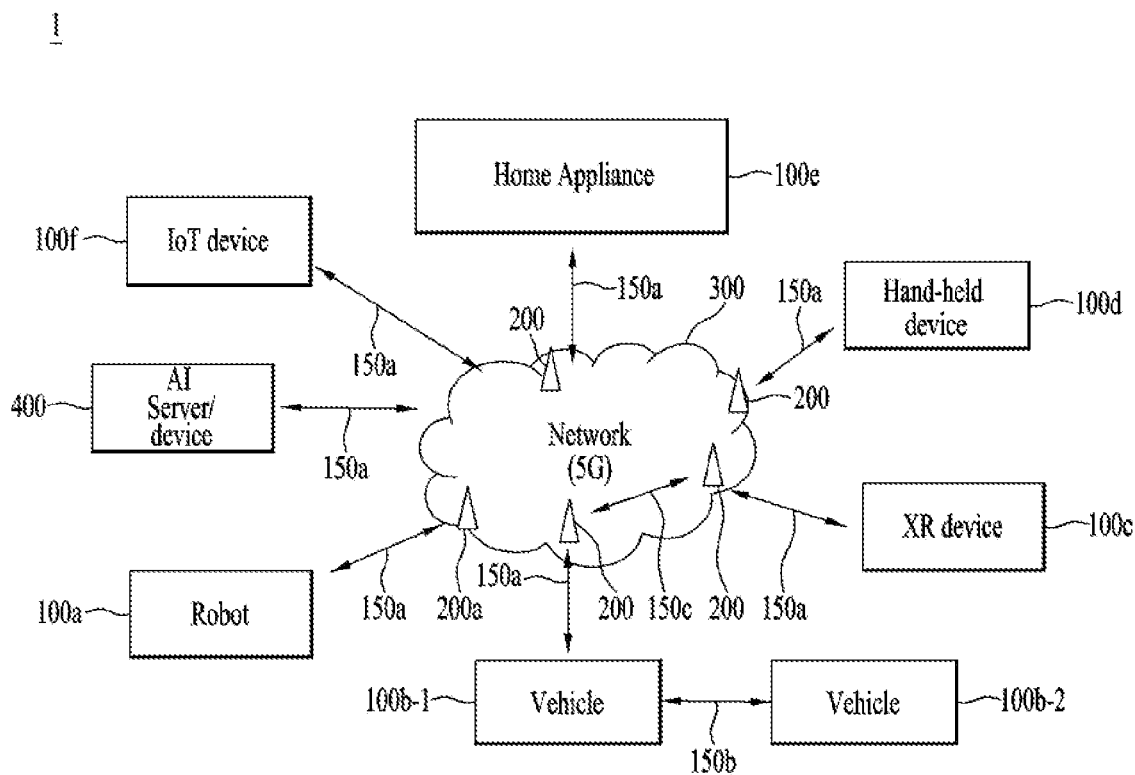
FIG. 18 illustrates an exemplary communication system applied to the present disclosure.

FIG. 18 illustrates a communication system 1 applied to the present disclosure.

Referring to FIG. 18, the communication system 1 applied to the present disclosure includes wireless devices, BSs, and a network. A wireless device is a device performing communication using radio access technology (RAT) (e.g., 5G NR (or New RAT) or LTE), also referred to as a communication/radio/5G device. The wireless devices may include, not limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of vehicle-to-vehicle (V2V) communication. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television (TV), a smartphone, a computer, a wearable device, a home appliance, a digital signage, a vehicle, a robot, and so on. The hand-held device may include a smartphone, a smartpad, a wearable device (e.g., a smartwatch or smartglasses), and a computer (e.g., a laptop). The home appliance may include a TV, a refrigerator, a washing machine, and so on. The IoT device may include a sensor, a smartmeter, and so on. For example, the BSs and the network may be implemented as wireless devices, and a specific wireless device 200a may operate as a BS/network node for other wireless devices.

The wireless devices 100a to 100f may be connected to the network 300 via the BSs 200. An AI technology may be applied to the wireless devices 100a to 100f, and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without intervention of the BSs/network. For example, the vehicles 100b-1 and 100b-2 may perform direct communication (e.g. V2V/vehicle-to-everything (V2X) communication). The IoT device (e.g., a sensor) may perform direct communication with other IoT devices (e.g., sensors) or other wireless devices 100a to 100f.

Wireless communication/connections 150a, 150b, and 150c may be established between the wireless devices 100a to 100f/BS 200 and between the BSs 200. Herein, the wireless communication/connections may be established through various RATs (e.g., 5G NR) such as UL/DL communication 150a, sidelink communication 150b (or, D2D communication), or inter-BS communication (e.g. relay or integrated access backhaul (IAB)). Wireless signals may be transmitted and received between the wireless devices, between the wireless devices and the BSs, and between the BSs through the wireless communication/connections 150a, 150b, and 150c. For example, signals may be transmitted and receive don various physical channels through the wireless communication/connections 150a, 150b and 150c. To this end, at least a part of various configuration information configuring processes, various signal processing processes (e.g., channel encoding/decoding, modulation/demodulation, and resource mapping/demapping), and resource allocation processes, for transmitting/receiving wireless signals, may be performed based on the various proposals of the present disclosure.

Figure 19:
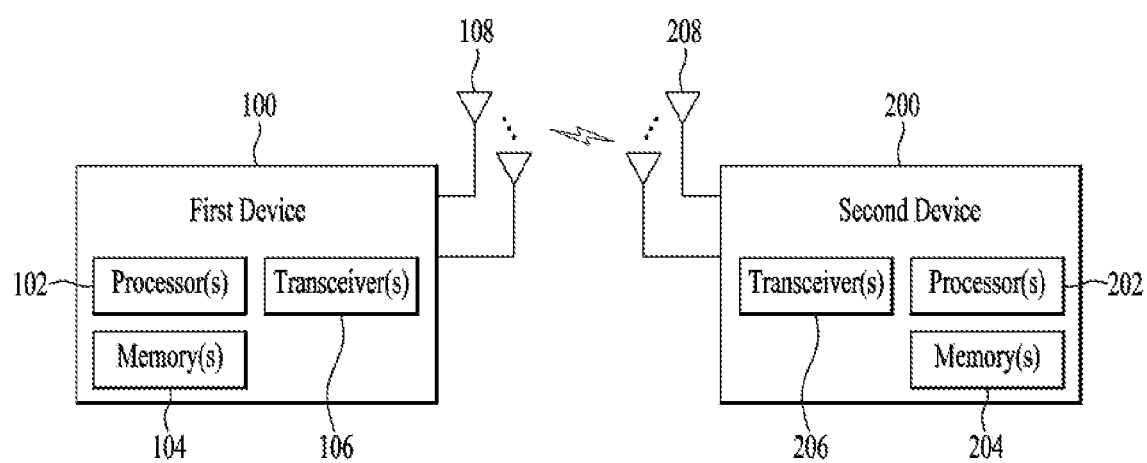
FIG. 19 illustrates an exemplary wireless device applicable to the present disclosure.

FIG. 19 illustrates wireless devices applicable to the present disclosure.

Referring to FIG. 19, a first wireless device 100 and a second wireless device 200 may transmit wireless signals through a variety of RATs (e.g., LTE and NR). {The first wireless device 100 and the second wireless device 200} may correspond to {the wireless device 100x and the BS 200} and/or {the wireless device 100x and the wireless device 100x} of FIG. 18.

The first wireless device 100 may include one or more processors 102 and one or more memories 104, and further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operation flowcharts disclosed in this document. For example, the processor(s) 102 may process information in the memory(s) 104 to generate first information/signals and then transmit wireless signals including the first information/signals through the transceiver(s) 106. The processor(s) 102 may receive wireless signals including second information/signals through the transceiver(s) 106 and then store information obtained by processing the second information/signals in the memory(s) 104. The memory(s) 104 may be connected to the processor(s) 102 and may store various pieces of information related to operations of the processor(s) 102. For example, the memory(s) 104 may store software code including instructions for performing all or a part of processes controlled by the processor(s) 102 or for performing the descriptions, functions, procedures, proposals, methods, and/or operation flowcharts disclosed in this document. The processor(s) 102 and the memory(s) 104 may be a part of a communication modem/circuit/chip designed to implement RAT (e.g., LTE or NR). The transceiver(s) 106 may be connected to the processor(s) 102 and transmit and/or receive wireless signals through the one or more antennas 108. Each of the transceiver(s) 106 may include a transmitter and/or a receiver. The transceiver(s) 106 may be interchangeably used with radio frequency (RF) unit(s). In the present disclosure, the wireless device may be a communication modem/circuit/chip.

The second wireless device 200 may include one or more processors 202 and one or more memories 204, and further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operation flowcharts disclosed in this document. For example, the processor(s) 202 may process information in the memory(s) 204 to generate third information/signals and then transmit wireless signals including the third information/signals through the transceiver(s) 206. The processor(s) 202 may receive wireless signals including fourth information/signals through the transceiver(s) 106 and then store information obtained by processing the fourth information/signals in the memory(s) 204. The memory(s) 204 may be connected to the processor(s) 202 and store various pieces of information related to operations of the processor(s) 202. For example, the memory(s) 204 may store software code including instructions for performing all or a part of processes controlled by the processor(s) 202 or for performing the descriptions, functions, procedures, proposals, methods, and/or operation flowcharts disclosed in this document. The processor(s) 202 and the memory(s) 204 may be a part of a communication modem/circuit/chip designed to implement RAT (e.g., LTE or NR). The transceiver(s) 206 may be connected to the processor(s) 202 and transmit and/or receive wireless signals through the one or more antennas 208. Each of the transceiver(s) 206 may include a transmitter and/or a receiver. The transceiver(s) 206 may be interchangeably used with RF unit(s). In the present disclosure, the wireless device may be a communication modem/circuit/chip.

Now, hardware elements of the wireless devices 100 and 200 will be described in greater detail. One or more protocol layers may be implemented by, not limited to, one or more processors 102 and 202. For example, the one or more processors 102 and 202 may implement one or more layers (e.g., functional layers such as physical (PHY), medium access control (MAC), radio link control (RLC), packet data convergence protocol (PDCP), RRC, and service data adaptation protocol (SDAP)). The one or more processors 102 and 202 may generate one or more protocol data units (PDUs) and/or one or more service data Units (SDUs) according to the descriptions, functions, procedures, proposals, methods, and/or operation flowcharts disclosed in this document. The one or more processors 102 and 202 may generate messages, control information, data, or information according to the descriptions, functions, procedures, proposals, methods, and/or operation flowcharts disclosed in this document and provide the messages, control information, data, or information to one or more transceivers 106 and 206. The one or more processors 102 and 202 may generate signals (e.g., baseband signals) including PDUs, SDUs, messages, control information, data, or information according to the descriptions, functions, procedures, proposals, methods, and/or operation flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operation flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operation flowcharts disclosed in this document may be implemented using firmware or software, and the firmware or software may be configured to include the modules, procedures, or functions. Firmware or software configured to perform the descriptions, functions, procedures, proposals, methods, and/or operation flowcharts disclosed in this document may be included in the one or more processors 102 and 202 or may be stored in the one or more memories 104 and 204 and executed by the one or more processors 102 and 202. The descriptions, functions, procedures, proposals, methods, and/or operation flowcharts disclosed in this document may be implemented using firmware or software in the form of code, an instruction, and/or a set of instructions.

The one or more memories 104 and 204 may be connected to the one or more processors 102 and 202 and store various types of data, signals, messages, information, programs, code, instructions, and/or commands. The one or more memories 104 and 204 may be configured to include read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or wireless signals/channels, mentioned in the methods and/or operation flowcharts of this document, to one or more other devices. The one or more transceivers 106 and 206 may receive user data, control information, and/or wireless signals/channels, mentioned in the descriptions, functions, procedures, proposals, methods, and/or operation flowcharts disclosed in this document, from one or more other devices. For example, the one or more transceivers 106 and 206 may be connected to the one or more processors 102 and 202 and transmit and receive wireless signals. For example, the one or more processors 102 and 202 may perform control so that the one or more transceivers 106 and 206 may transmit user data, control information, or wireless signals to one or more other devices. The one or more processors 102 and 202 may perform control so that the one or more transceivers 106 and 206 may receive user data, control information, or wireless signals from one or more other devices. The one or more transceivers 106 and 206 may be connected to the one or more antennas 108 and 208 and the one or more transceivers 106 and 206 may be configured to transmit and receive user data, control information, and/or wireless signals/channels, mentioned in the descriptions, functions, procedures, proposals, methods, and/or operation flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received wireless signals/channels from RF band signals into baseband signals in order to process received user data, control information, and wireless signals/channels using the one or more processors 102 and 202. The one or more transceivers 106 and 206 may convert the user data, control information, and wireless signals/channels processed using the one or more processors 102 and 202 from the baseband signals into the RF band signals. To this end, the one or more transceivers 106 and 206 may include (analog) oscillators and/or filters.

Figure 20:
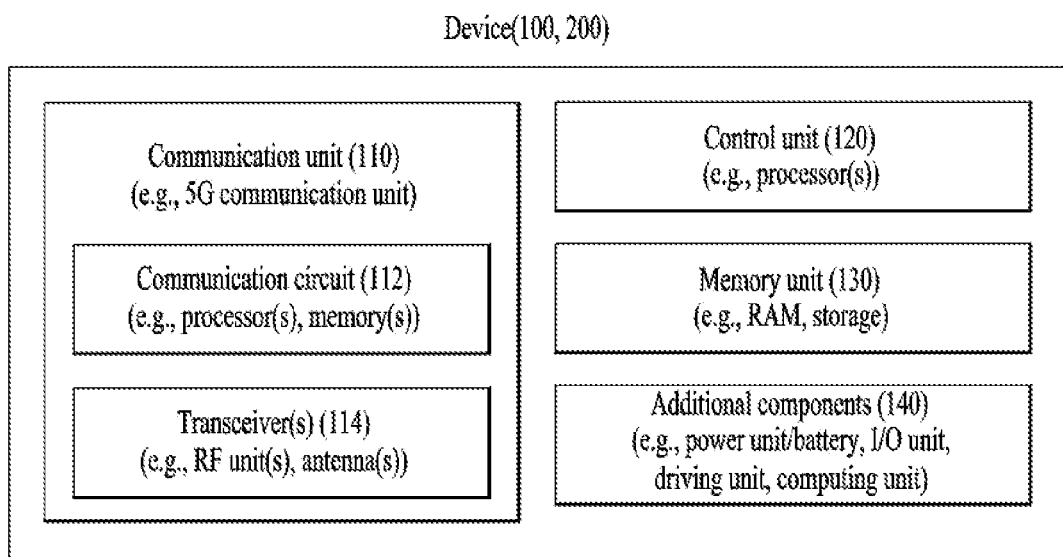
FIG. 20 illustrates another exemplary wireless device applicable to the present disclosure.

FIG. 20 illustrates another example of a wireless device applied to the present disclosure. The wireless device may be implemented in various forms according to a use case/service (refer to FIG. 18).

Referring to FIG. 20, wireless devices 100 and 200 may correspond to the wireless devices 100 and 200 of FIG. 18 and may be configured to include various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 and/or the one or more memories 104 and 204 of FIG. 19. For example, the transceiver(s) 114 may include the one or more transceivers 106 and 206 and/or the one or more antennas 108 and 208 of FIG. 19. The control unit 120 is electrically connected to the communication unit 110, the memory 130, and the additional components 140 and provides overall control to the wireless device. For example, the control unit 120 may control an electric/mechanical operation of the wireless device based on programs/code/instructions/information stored in the memory unit 130. The control unit 120 may transmit the information stored in the memory unit 130 to the outside (e.g., other communication devices) via the communication unit 110 through a wireless/wired interface or store, in the memory unit 130, information received through the wireless/wired interface from the outside (e.g., other communication devices) via the communication unit 110.

The additional components 140 may be configured in various manners according to type of the wireless device. For example, the additional components 140 may include at least one of a power unit/battery, input/output (I/O) unit, a driving unit, and a computing unit. The wireless device may be implemented in the form of, not limited to, the robot (100a of FIG. 18), the vehicles (100b-1 and 100b-2 of FIG. 18), the XR device (100c of FIG. 18), the hand-held device (100d of FIG. 18), the home appliance (100e of FIG. 18), the IoT device (100f of FIG. 18), a digital broadcasting terminal, a hologram device, a public safety device, an MTC device, a medical device, a FinTech device (or a finance device), a security device, a climate/environment device, the AI server/device (400 of FIG. 18), the BSs (200 of FIG. 18), a network node, or the like. The wireless device may be mobile or fixed according to a use case/service.

In FIG. 20, all of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module in the wireless devices 100 and 200 may further include one or more elements. For example, the control unit 120 may be configured with a set of one or more processors. For example, the control unit 120 may be configured with a set of a communication control processor, an application processor, an electronic control unit (ECU), a graphical processing unit, and a memory control processor. In another example, the memory 130 may be configured with a RAM, a dynamic RAM (DRAM), a ROM, a flash memory, a volatile memory, a non-volatile memory, and/or a combination thereof.

Figure 21:
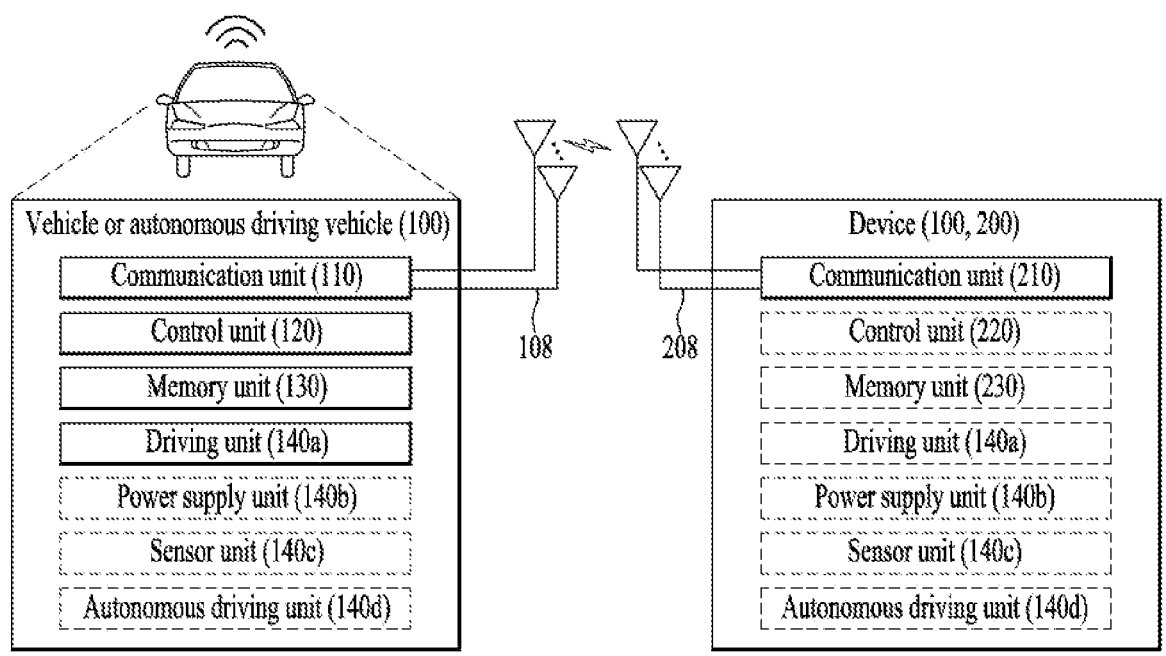
FIG. 21 illustrates an exemplary vehicle or autonomous driving vehicle applicable to the present disclosure.

FIG. 21 illustrates a vehicle or an autonomous driving vehicle applied to the present disclosure. The vehicle or autonomous driving vehicle may be implemented as a mobile robot, a car, a train, a manned/unmanned aerial vehicle (AV), a ship, or the like.

Referring to FIG. 21, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 20, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140a may enable the vehicle or the autonomous driving vehicle 100 to drive on a road. The driving unit 140a may include an engine, a motor, a powertrain, a wheel, a brake, a steering device, and so on. The power supply unit 140b may supply power to the vehicle or the autonomous driving vehicle 100 and include a wired/wireless charging circuit, a battery, and so on. The sensor unit 140c may acquire information about a vehicle state, ambient environment information, user information, and so on. The sensor unit 140c may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit 140d may implement technology for maintaining a lane on which the vehicle is driving, technology for automatically adjusting speed, such as adaptive cruise control, technology for autonomously driving along a determined path, technology for driving by automatically setting a route if a destination is set, and the like.

For example, the communication unit 110 may receive map data, traffic information data, and so on from an external server. The autonomous driving unit 140d may generate an autonomous driving route and a driving plan from the obtained data. The control unit 120 may control the driving unit 140a such that the vehicle or autonomous driving vehicle 100 may move along the autonomous driving route according to the driving plan (e.g., speed/direction control). During autonomous driving, the communication unit 110 may aperiodically/periodically acquire recent traffic information data from the external server and acquire surrounding traffic information data from neighboring vehicles. During autonomous driving, the sensor unit 140c may obtain information about a vehicle state and/or surrounding environment information. The autonomous driving unit 140d may update the autonomous driving route and the driving plan based on the newly obtained data/information. The communication unit 110 may transfer information about a vehicle position, the autonomous driving route, and/or the driving plan to the external server. The external server may predict traffic information data using AI technology based on the information collected from vehicles or autonomous driving vehicles and provide the predicted traffic information data to the vehicles or the autonomous driving vehicles.

The embodiments of the present disclosure described above are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present disclosure or included as a new claim by a subsequent amendment after the application is filed.

The embodiments of the present disclosure have been described above, focusing on the signal transmission and reception relationship between a UE and a BS. The signal transmission and reception relationship is extended to signal transmission and reception between a UE and a relay or between a BS and a relay in the same manner or a similar manner. A specific operation described as performed by a BS may be performed by an upper node of the BS. Namely, it is apparent that, in a network comprised of a plurality of network nodes including a BS, various operations performed for communication with a UE may be performed by the BS, or network nodes other than the BS. The term BS may be replaced with the term fixed station, Node B, enhanced Node B (eNode B or eNB), access point, and so on. Further, the term UE may be replaced with the term terminal, mobile station (MS), mobile subscriber station (MSS), and so on.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The present disclosure may be used in a UE, a BS, or other devices in a mobile communication system.

The invention claimed is:
1. A method of transmitting a Physical Uplink Shared Channel (PUSCH) by a user equipment (UE) in a wireless communication system, the method comprising:
receiving, through a higher layer, one or more entries among a plurality of entries,
wherein the plurality of entries are included in a predefined table, and wherein each of the plurality of entries corresponds to (i) a Channel Access Type and (ii) information related to a start position for a PUSCH transmission;
receiving downlink control information (DCI) used for informing (i) a start symbol of the PUSCH and (ii) an entry among the one or more entries; and
transmitting the PUSCH based on the DCI,
wherein the start position for the PUSCH transmission precedes the start symbol for the PUSCH.

2. The method of claim 1, wherein the start position for the PUSCH transmission is related to a cyclic prefix (CP).

3. The method of claim 1, wherein the start position is determined based on a subcarrier spacing (SCS).

4. The method of claim 1, wherein the start position is determined based on a timing advance (TA).

5. The method of claim 1, wherein a number of Channel Access Types is 4, a number of start positions is m, a number of the plurality of entries is a maximum of 4m, and m is a natural number.

6. The method of claim 1, wherein the PUSCH is transmitted in an unlicensed band.

7. The method of claim 1, wherein the start position is determined based on a gap for Listen-before-Talk (LBT).

8. The method of claim 7, wherein the gap is one of 25 μs and 16 μs.

9. A user equipment (UE) of transmitting a Physical Uplink Shared Channel (PUSCH) in a wireless communication system, the UE comprising:
at least one transceiver;
at least one processor; and
at least one computer memory operably connectable to the at least one processor and storing instructions that, when executed, cause the at least one processor to perform operations comprising:
receiving, through a higher layer, one or more entries among a plurality of entries through the at least one transceiver,
wherein the plurality of entries are included in a predefined table, and wherein each of the plurality of entries corresponds to (i) a Channel Access Type and (ii) information related to a start position for a PUSCH transmission;
receiving, through the at least one transceiver, downlink control information (DCI) used for informing (i) a start symbol of the PUSCH and (ii) an entry among the one or more entries; and
transmitting, through the at least one transceiver, the PUSCH based on the DCI, and
wherein the start position for the PUSCH transmission precedes the start symbol for the PUSCH.

10. The UE of claim 9, wherein the start position for the PUSCH transmission is related to a cyclic prefix (CP).

11. The UE of claim 9, wherein the start position is determined based on a subcarrier spacing (SCS).

12. The UE of claim 9, wherein the start position is determined based on a timing advance (TA).

13. The UE of claim 9, wherein the number of Channel Access Types is 4, the number of start positions is m, a number of the plurality of entries is a maximum of 4m, and m is a natural number.

14. The UE of claim 9, wherein the PUSCH is transmitted in an unlicensed band.

15. The UE of claim 9, wherein the start position is determined based on a gap for Listen-before-Talk (LBT).

16. The UE of claim 15, wherein the gap is one of 25 μs and 16 μs.

17. An apparatus of transmitting a Physical Uplink Shared Channel (PUSCH), the apparatus comprising:
at least one processor; and
at least one computer memory operably connectable to the at least one processor and storing instructions that, when executed, cause the at least one processor to perform operations comprising:
receiving, through a higher layer, one or more entries among a plurality of entries, wherein the plurality of entries are included in a predefined table, and wherein each of the plurality of entries corresponds to (i) a Channel Access Type and (ii) information related to a start position for a PUSCH transmission;

receiving downlink control information (DCI) used for informing (i) a start symbol of the PUSCH and (ii) an entry among the one or more entries; and transmitting the PUSCH based on the DCI, and wherein the start position for the PUSCH transmission precedes the start symbol for the PUSCH.

18. A non-transitory processor-readable medium storing one or more instructions which cause at least one processor to perform an operation, the operation comprising:

receiving, through a higher layer, one or more entries among a plurality of entries, wherein the plurality of entries are included in a predefined table, and wherein each of the plurality of entries corresponds to (i) a Channel Access Type and (ii) information related to a start position for a PUSCH transmission;

receiving downlink control information (DCI) used for informing (i) a start symbol of the PUSCH and (ii) an entry among the one or more entries; and transmitting the PUSCH based on the DCI, and wherein the start position for the PUSCH transmission precedes the start symbol for the PUSCH.

\* \* \* \* \*